(12) United States Patent  
Matsumura et al.

(10) Patent No.: US 10,999,025 B2  
(45) Date of Patent: May 4, 2021

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 47 days.

(21) Appl. No.: 16/479,502

(22) PCT Filed: Jan. 19, 2018

(86) PCT No.: PCT/JP2018/001508  
§ 371 (c)(1),  
(2) Date: Jul. 19, 2019

(87) PCT Pub. No.: WO2018/135607  
PCT Pub. Date: Jul. 26, 2018

(65) Prior Publication Data  
US 2019/0386795 A1    Dec. 19, 2019

(30) Foreign Application Priority Data

Jan. 20, 2017   (JP) .............................. JP2017-008948

(51) Int. Cl.  
*H04L 5/00* (2006.01)  
*H04W 72/04* (2009.01)

(52) U.S. Cl.  
CPC .......... *H04L 5/0012* (2013.01); *H04L 5/0042* (2013.01); *H04L 5/0048* (2013.01);  
(Continued)

(58) Field of Classification Search  
CPC ... H04L 5/0012; H04L 5/0042; H04L 5/0053; H04L 5/0048; H04W 72/044; H04W 72/0413  
See application file for complete search history.

(56) References Cited

U.S. PATENT DOCUMENTS

2014/0198761 A1*  7/2014  Hooli .................. H04W 72/085  
                                                          370/329  
2015/0131551 A1   5/2015  Kakishima et al.

FOREIGN PATENT DOCUMENTS

JP         2013236329 A     11/2013  
JP          201526990 A      2/2015

OTHER PUBLICATIONS

"UL control channel for NR" 3GPP TSG RAN WG1 Meeting #87 R1-1612718, Nov. 18, 2016 (Year: 2016).*  
(Continued)

*Primary Examiner* — Jamal Javaid  
(74) *Attorney, Agent, or Firm* — Osha Bergman Watanabe & Burton LLP

(57) ABSTRACT

The present invention is designed to reduce the degradation of communication quality even when future radio communication systems support UL control channels of different formats than existing systems. A transmission section that allocates uplink control information and an uplink reference signal to different frequency resources in an uplink control channel allocation field, and transmits the uplink control information and the uplink reference signal, and a control section that controls the allocation of the uplink control information and the uplink reference signal are provided, and the control section makes the frequency resources where the uplink reference signal is allocated hop between different time fields and/or between different resource blocks.

13 Claims, 23 Drawing Sheets

(52) U.S. Cl.
CPC ......... *H04L 5/0053* (2013.01); *H04W 72/044* (2013.01); *H04W 72/0413* (2013.01)

(56) References Cited

OTHER PUBLICATIONS

"On inter-slot or Inter-subframe comb hopping for UL DMRS with IFDMA" 3GPP TSG RAN WG1 Meeting #87 R1-1612682, Nov. 18, 2016 (Year: 2016).*
International Search Report issued for PCT/JP2018/001508, dated Apr. 3, 2018 (5 pages).
Written Opinion issued for PCT/JP2018/001508, dated Apr. 3, 2018 (5 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
NTT Docomo, Inc.; "UL control channel for NR"; 3GPP TSG RAN WG1 Meeting #87 R1-1612718; Reno, USA, Nov. 14-18, 2016 (4 pages).
Ericsson; "On Inter-slot or Inter-subframe Comb Hopping for UL DMRS with IFDMA"; 3GPP TSG-RAN WG1#87 R1-1612682; Reno, NV, USA, Nov. 14-18, 2016 (4 pages).

* cited by examiner

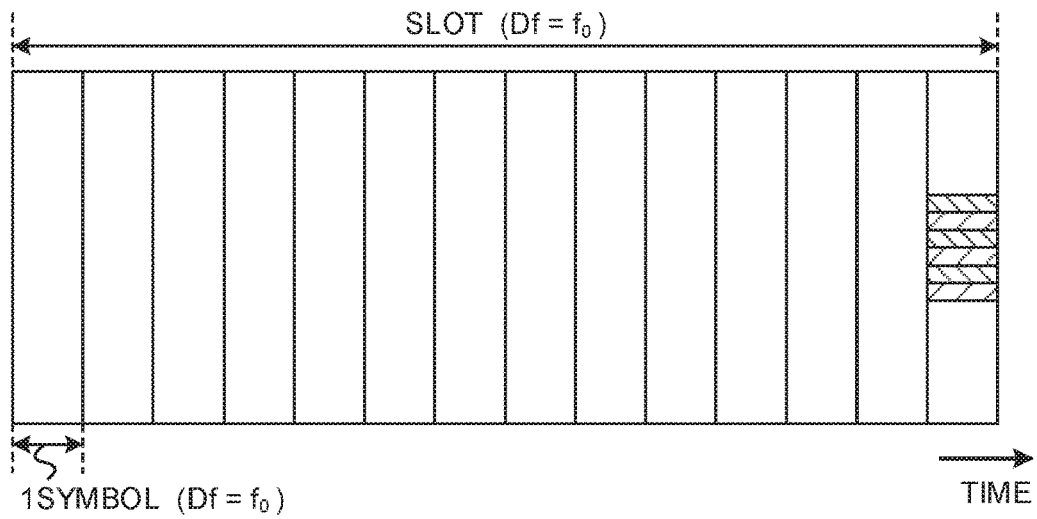
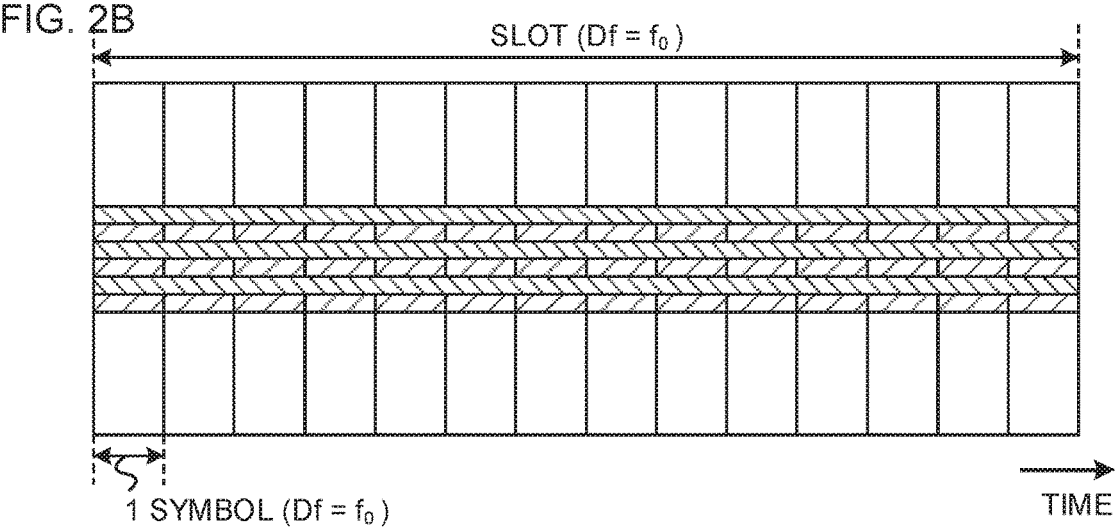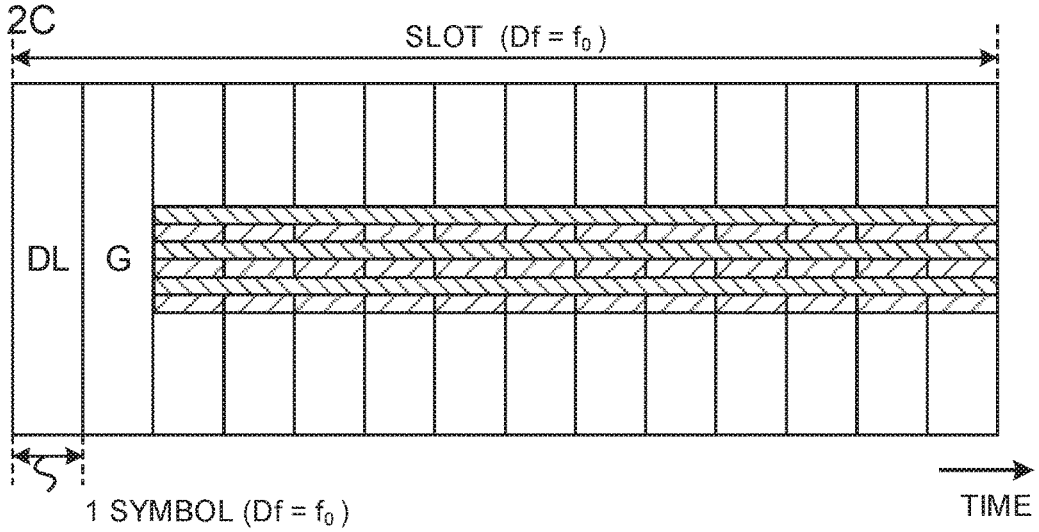

UCI    RS

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1), in addition, successor systems of LTE are also under study for the purpose of achieving further broadbandization and increased speed beyond LTE (referred to as, for example, "LTE-A (LTE-Advanced)," "ERA (Future Radio Access)," "4G," "5G," "5G+ (plus)," "NR (New RAT)," "LTE Rel. 14," "LTE Rel. 15 (or later versions)," and so on).

In existing LTE systems (for example, LTE Rel. 8 to 13), downlink (DL) and/or uplink (UL) communication are performed using one-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ: Hybrid Automatic Repeat reQuest) and so on.

Also, in existing LTE systems (for example, LTE Rel. 8 to 13), a user terminal transmits uplink control information (UCI) by using a UL control channel (for example, PUCCH: Physical Uplink Control Channel) a UL data channel (for example, PUSCH: Physical Uplink Shared Channel). The format of this UL control channel is referred to as "PUCCH format" and so on.

UCI includes at least one of a scheduling request (SR), retransmission control information (HARQ-ACK (Hybrid Automatic Repeat reQuest-Acknowledgement), ACK and/or NACK (Negative ACK)) in response to DL data (DL data channel (for example, PDSCH: Physical Downlink Shared Channel)), and channel state information (CSI).

CITATION LIST

Non-Patent Literature

Non-Patent Literature 1; 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

It is assumed that future radio communication systems (for example, LTE Rel. 14, LTE Rel. 15 (or later versions), 5G, NR, etc.) will transmit UCI using a UL control channel of a different format than existing LTE systems (for example, LTE Rel. 13 and/or earlier versions).

For example, the PUCCH formats for use in existing LTE systems are comprised of one-ms subframe units. Meanwhile, for future radio communication systems, a study is in progress to support a UL control e having a shorter duration than existing LTE systems (hereinafter also referred to as a "short PUCCH"). Furthermore, a study is in progress to support a UL control channel having a longer duration than this short PUCCH (hereinafter also referred to as a "long PUCCH").

Thus, future radio communication systems are assumed to support UL control channels of various formats (including, for example, a short PUCCH, a long PUCCH and so on). Meanwhile, the UL reference signal for demodulation may be used to demodulate UL control channels (or uplink control information). However, the problem is how to control the transmission of UL control information and UL reference signals. If UL control information and UL reference signals are not transmitted properly, this may lead to the deterioration of the quality of communication.

The present invention has been made in view of the above, and it is therefore an object of the present invention provide a user terminal and a radio communication method that can reduce the deterioration of communication quality even when future radio communication systems support UL control channels of different formats than existing systems.

Solution to Problem

A user terminal according to one aspect of the present invention has a transmission section that allocates uplink control information and an uplink reference signal to different frequency resources in an uplink control channel allocation field, and transmits the uplink control information and the uplink reference signal, and a control section that controls the allocation of the uplink control information and the uplink reference signal, and, in this user terminal, the control section makes the frequency resources where the uplink reference signal is allocated hop between different time fields and/or between different resource blocks.

Advantageous Effects of Invention

According to the present invention, the deterioration of communication quality can be reduced even when future radio communication systems support UL control channels of different formats than existing systems.

BRIEF DESCRIPTION OF DRAWINGS

FIG. 2A to FIG. 2C are diagrams, each showing a sample method of multiplexing UCI and RSs;

DESCRIPTION OF EMBODIMENTS

Figure 1A:
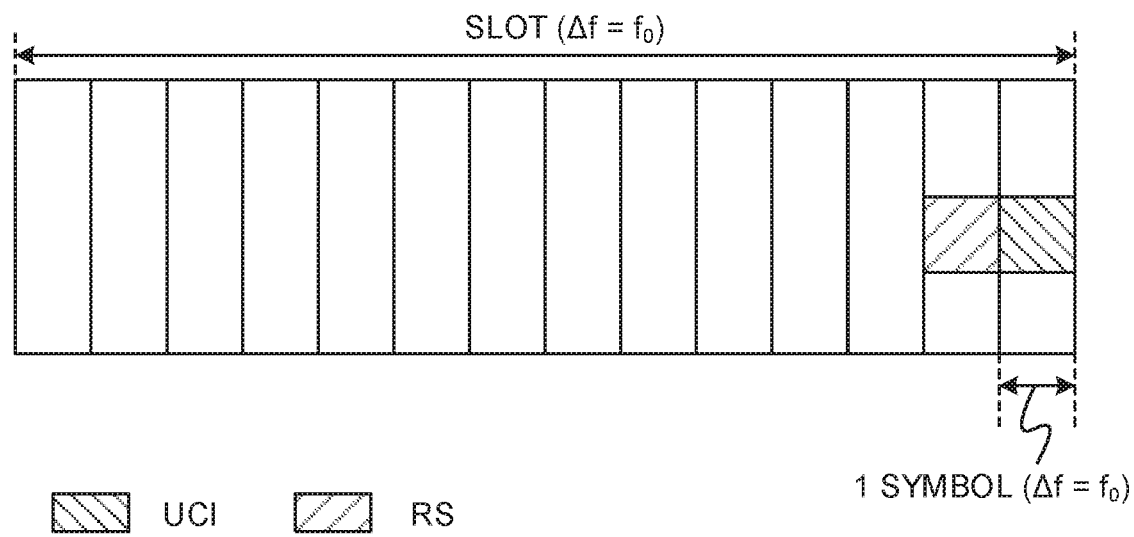
FIG. 1A and FIG. 1B are diagrams, each showing a sample UL control channel format.

Future radio communication systems (for example, LTE Rel. 14, 15 and/or later versions, 5G, NR, etc.) are under study to introduce multiple numerologies, not a single numerology.

Note that numerology may refer to a set of communication parameters that characterize the design of signals in a given RAT (Radio Access Technology), the design of the RAT and so on, or may be parameters that relate to the frequency direction and/or the time direction, such as subcarrier spacing (SCS), symbol duration, cyclic prefix duration, subframe duration and so on. For example, future radio communication systems may support multiple SCS spacings such as 15 kHz, 30 kHz, 60 kHz, 120 kHz and 240 kHz.

Also, future radio communication systems are being studied to introduce time units (also referred to as "subframes," "slots," "minislots," "subslots," "transmission time intervals (TTIs)," "short TTIs," "radio frames" and so on) that are the same and/or different than existing LTE systems (LTE Rel. 13 or earlier versions), while supporting multiple numerologies and so on.

Note that the TTI may represent the unit of time in transmitting and receiving transport blocks, code blocks and/or codewords of transmitting/receiving data. When a TTI is provided, the period of time (for example, the number of symbols) in which transport blocks, code blocks and/or codewords are actually mapped may be shorter than the TTI.

For example, when a TTI is formed with a predetermined number of symbols (for example, fourteen symbols), transport blocks, code blocks and/or codewords of transmitting/receiving data can be transmitted and received in one or a predetermined number of symbol periods. If the number of symbols in which transport blocks, code blocks and/or codewords of transmitting/receiving data are transmitted/received is smaller than the number of symbols constituting the TTI, reference signals, control signals and so on can be mapped to symbols in the TTI where no data is mapped.

Subframes may serve as a time unit having a predetermined time duration (for example, one ms), irrespective of which numerology is used by (and/or configured in) the user terminal (for example, UE (User Equipment)).

On the other hand, slots may serve as a time unit that is based on numerology used by the UE. For example, if the subcarrier spacing is 15 kHz or 30 kHz, the number of symbols per slot may be seven or fourteen. When the subcarrier spacing is 60 kHz or greater, the number of symbols per slot may be fourteen. In addition, a slot may include a plurality of minislots (subslots).

Generally, subcarrier spacing and symbol duration hold a reciprocal relationship. Therefore, as long as the number of symbols per slot (or minislot (subslot)) stays the same, the higher (wider) the subcarrier spacing, the shorter the slot length, and the lower (narrower) the subcarrier spacing, the longer the slot length. Note that "subcarrier spacing is high" may be paraphrased as "subcarrier spacing is wide," and "subcarrier spacing is low" may be paraphrased as "subcarrier spacing is narrow."

For such future radio communication systems, a study is in progress to support a UL control channel (hereinafter also referred to as a "short PUCCH") that is structured to be shorter n duration than the PUCCH formats of existing LTE systems (for example, LTE Rel. 13 and/or earlier versions) and/or a UL control channel (hereinafter also referred to as a "long PUCCH") that is structured to have a longer duration than the above short duration.

A short PUCCH is formed with a predetermined number of symbols (for example, one symbol or two symbols) in a given SCS. In this short PUCCH, uplink control information (UCI) and a reference signal (RS) may be time-division-multiplexed (TDM: Time Division Multiplexing) or frequency-division-multiplexed (FDM: Frequency Division Multiplexing). The RS may be, for example, the demodulation reference signal (DMRS: DeModulation Reference Signal), which is used to demodulate UCI.

The SCS in each symbol of the short PUCCH may be the same as or higher than the SCS in symbols (hereinafter also referred to as "data symbols") for the data channel (also referred to as"data," "PUSCH," "PDSCH," etc.). A short PUCCH may be referred to as a "PUCCH with a higher (bigger, wider, etc.) SCS (for example, 60 kHz)." Note that the time unit which one short PUCCH is transmitted may be referred to as a "short TTI."

In a short PUCCH, a multicarrier waveform (for example, a waveform based on cyclic prefix OFDM (CP-OFDM: Cyclic Prefix Orthogonal Frequency Division Multiplexing)) may be used, or a single-carrier waveform (for example, a waveform based on DFT-S-OFDM (Discrete Fourier Transform Spread Orthogonal Frequency Division Multiplexing) may be used.

Note that the waveform may be referred to as "communication scheme," "multiplexing scheme," "modulation scheme," "access scheme," "waveform scheme," and so on. Also, these waveforms may be characterized based on whether or not DFT preceding (spreading) is applied to the OFDM waveform. For example, CP-OFDM may be referred to as the "waveform (signal) to which DFT precoding is not applied," and DFT-S-OFDM may be referred to as the "waveform (signal) to which DFT precoding is applied." Furthermore, a "waveform" may also be referred to as "waveform signal," "signal in accordance with waveform," "waveform of signal," "signal," and so on.

Figure 1B:
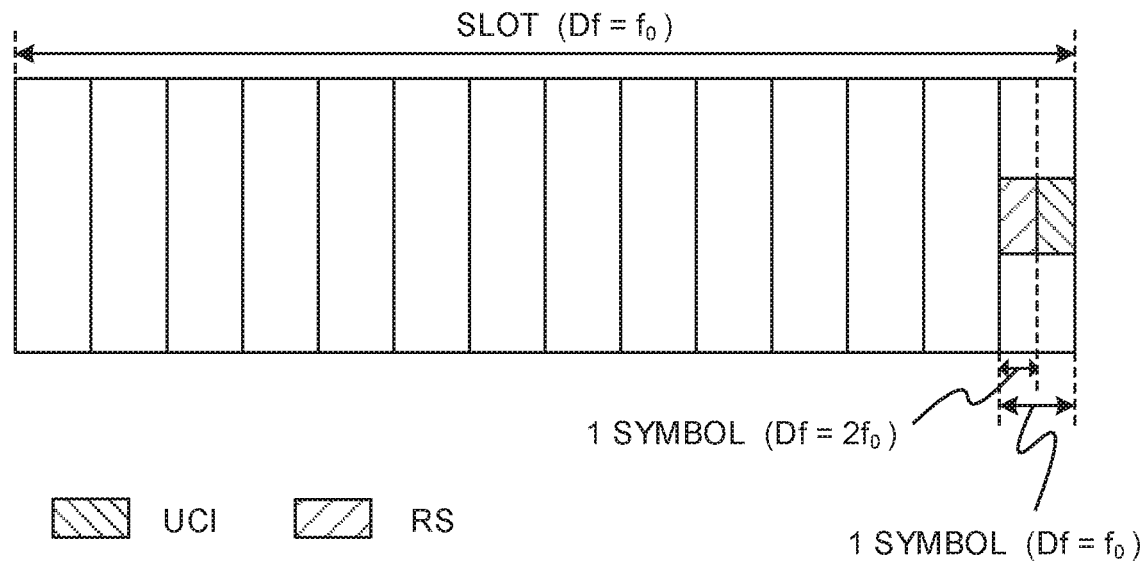

FIGS. 1A and 1B are diagrams, each showing an example of a short PUCCH format for future radio communication systems. In these examples, one slot is formed with fourteen symbols, each having a subcarrier spacing of $\Delta f = f_0$ (for example, 15 kHz), but the number of symbols to be included in one slot is by no means limited to this.

In FIG. 1A and FIG. 1B, a short PUCCH is placed (mapped) in a predetermined number of symbols (here, one symbol or two symbols) from the end of the slot. In addition, the short PUCCH is placed in one or more frequency resources (for example, one or more physical resource blocks (PRBs)).

As shown in FIG. 1A, a short PUCCH is under study to time-division-multiplex (TDM) UCI and an RS over a plurality of symbols. In this short PUCCH, the UCI and the RS are arranged in different symbols. A multicarrier waveform (for example, the OFDM waveform) or a single-carrier waveform (for example, the DFT-s-OFDM waveform) can be applied to this short PUCCH.

Meanwhile, as shown in FIG. 1B, a short PUCCH is also under study to time-division-multiplex (TDM) UCI and an RS over a plurality of symbols having a higher SCS (for example, $2f_0$) than the SCS ($=f_0$) constituting the slot. In this case, within one symbol (which may be referred to as, for example, a "long symbol") in the slot, multiple symbols (which may be referred to as, for example, "short symbols") with a higher SCS can be placed. In this short PUCCH, UCI and an RS are arranged in different short symbols. A multicarrier waveform for example, the OFDM waveform) or a single-carrier waveform (for example, the DFT-s-OFDM) can be applied to this short PUCCH.

Note that, although FIG. 1A and FIG. 1B show examples in which the short PUCCH is mapped to the fast symbol in the slot, the short PUCCH is by no means limited to this location. For example, a predetermined number of symbols at the beginning or in the middle of the slot may be symbols for arranging the short PUCCH.

Meanwhile, the long PUCCH is arranged over a plurality of symbols in the slot so as to improve the coverage over the short PUCCH. The long PUCCH may be referred to as a "PUCCH with a lower (smaller, narrower, etc.) SCS (for example, 15 kHz)." Note that the time unit in which one long PUCCH is transmitted may be referred to as a "long TTI."

The long PUCCH may be comprised of a number of frequency resources to match the short PUCCH, or the long PUCCH may be formed with a smaller number of frequency resources (for example, one or two PRBs) than the short PUCCH, in order to achieve a power boosting effect. Also, the long PUCCH may be placed with the short PUCCH in the same slot.

For the long PUCCH, a single-carrier waveform (for example, DFT-s-OFDM waveform) may be used, or a multicarrier waveform (for example, OFDM waveform) may be used. Note that the long PUCCH may be a PUCCH that is different from the PUCCHs (PUCCHs of different formats) stipulated in existing LTE systems (for example, LTE Rel. 8 to 13).

Although FIG. 1 show cases where UCI and an RS are time-division-multiplexed (TDM), the UCI and the RS may be frequency-division-multiplexed (FDM) in symbols constituting the short PUCCH and/or the long PUCCH. For example, when a multicarrier waveform (OFDM waveform) is applied to the PUCCH, UL reference signals and UCI may be frequency-multiplexed and arranged (see FIG. 2).

FIG. 2A shows a case where, in a format (short PUCCH) which an uplink control channel is arranged in the last symbol of a predetermined time unit (for example, a slot), an uplink reference signal (for example, a DMRS) and UCI are frequency-multiplexed.

FIG. 2B and FIG. 2C each show a case where a DMRS and UCI are frequency-multiplexed in a long PUCCH. FIG. 2B shows an example of a slot (UL-only slot), in which UL signals (for example, PUSCH and/or PUCCH) are transmitted/received, and FIG. 2C shows an example of a slot (UL-centric slot), in which a DL signal (for example, PDCCH) is transmitted and received in a predetermined number of symbols (here, the first one symbol), a symbol (gap (G) period) for switching between DL and UL is provided, and UL signals (for example, PUSCH and/or PUCCH) are transmitted and received in the rest of the symbols. Note that the slots to which a long PUCCH can be applied are by no means limited to UL-only slots and/or UL-centric slots.

In the UL-only slot shown in FIG. 2B, the long PUCCH is arranged over all of the fourteen symbols in the slot. In the UL-centric slot of FIG. 2C, the long PUCCH is placed over twelve symbols for UL signals in the slot. Hereinafter, a "PUCCH," when simply mentioned so, may be read as "a short PUCCH and/or a long PUCCH."

When UCI and DMRSs are frequency-multiplexed, in frequency resources (for example, subcarriers) where DMRSs are not multiplexed, a user terminal performs channel estimation using the channel estimation result of subcarriers where DMRSs are multiplexed. The present inventors have focused on the fact that, in cases like this, the following problems will arise if the UCI and the DMRSs are simply frequency-multiplexed.

Figure 3A:
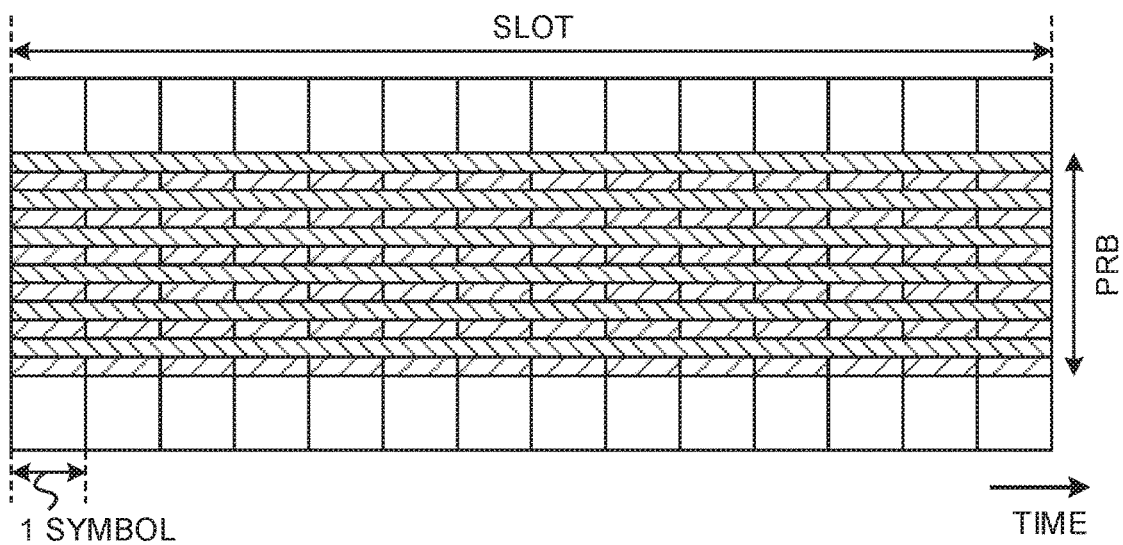
FIG. 3A and FIG. 3B are diagrams, each showing another sample method of multiplexing UCI and RSs.

Assume, for example, the case where the density f DMRSs is increased in a given frequency field (for example, one PRB) where a PUCCH is arranged (see FIG. 3A). FIG. 3A shows a case where, out of the 12 frequency resources (for example, subcarriers) included in one PRB, six are used for DMRSs and six are used for UCI. In this case, the density of DRMSs increases, so that it is possible to improve the accuracy of channel estimation when the UCI is demodulated. Meanwhile, since the density of DMRSs increases (the number of frequency resources for UCI decreases), it is necessary to make the coding to for UCI higher. This gives a possibility that the bit error rate performance of UCI deteriorates, which then may lead to a degradation of communication quality.

Figure 3B:
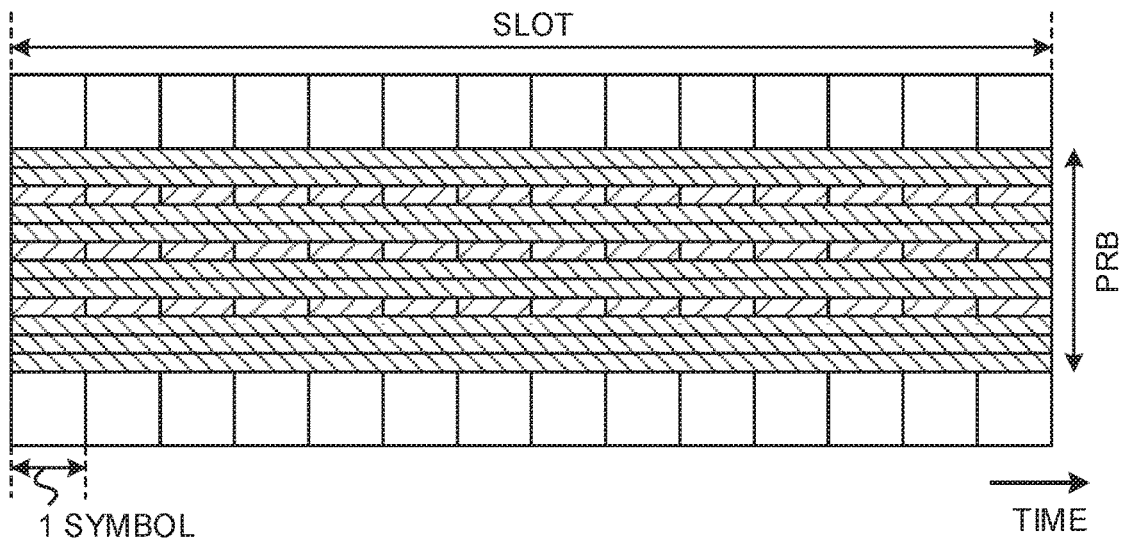

Next, assume the case where the density of DMRSs is lowered in a predetermined frequency field where a PUCCH is arranged (see FIG. 3B). FIG. 3B shows the case where, out of the 12 frequency resources (for example, subcarriers) included in one PRB, three are used for DMRSs and nine are used for UCI. In this case, the number of frequency resources for UCI can be increased, so that the coding rate for UCI can be lowered. Meanwhile since the density of DMRSs decreases (the number of DMRSs in the frequency direction decreases), the accuracy of channel estimation becomes lower in frequency-selective channels. Due to this, channel estimation errors may be produced, which might result in deteriorated bit error rate performance, and which then may lead to a degradation of communication quality.

Thus, the present inventors have noticed the fact that the quality of communication may be degraded when UCI and DMRSs are simply frequency-multiplexed, and come up with the idea of making frequency sources (for example, subcarriers) for allocating DMRSs hop between different time fields (for example, symbols) and/or between different resource blocks (for example, PRBs). By this means, DMRSs that are distributed by way of hopping can be used for channel estimation, without increasing the density of DMRSs, so that the degradation of communication quality can be reduced. As a result of this, the degradation of communication quality can be reduced even when UL control channels of different formats than existing systems are supported.

Now, the present embodiment will be described below in detail. Note that, in the present embodiment, the user terminals support one or more subcarrier spacings (for example, 15 kHz, 30 kHz, 60 kHz, 120 kHz, 240 kHz, etc.). Although cases will be described in the following description as examples where uplink control channels are allocated on a per resource block (PRB) basis, the method of allocating uplink control channels is by no means limited to this. Also, although formats will be described below as examples in which 12 frequency resources (for example, subcarriers) are included in one PRB, the number of subcarriers included in a PRB is by no means limited to this.

(First Aspect)

A case will be described here with a first aspect of the present invention where the frequency resources for multiplexing uplink reference signals (for example DMRS) are hopped between different time fields and/or between different frequency blocks.

Note that the frequency resources for multiplexing uplink reference signals may refer to "frequency resources to which uplink reference signals are allocated," "frequency resources to which uplink reference signals are mapped," "frequency resources in which uplink reference signals are inserted," and so on. Also, a frequency resource refers to, for example, a subcarrier, while a time field refers to, for example, a symbol, and a frequency block refers to, for example, a resource block. Obviously the present embodiment is by no means limited to these.

Figure 4A:
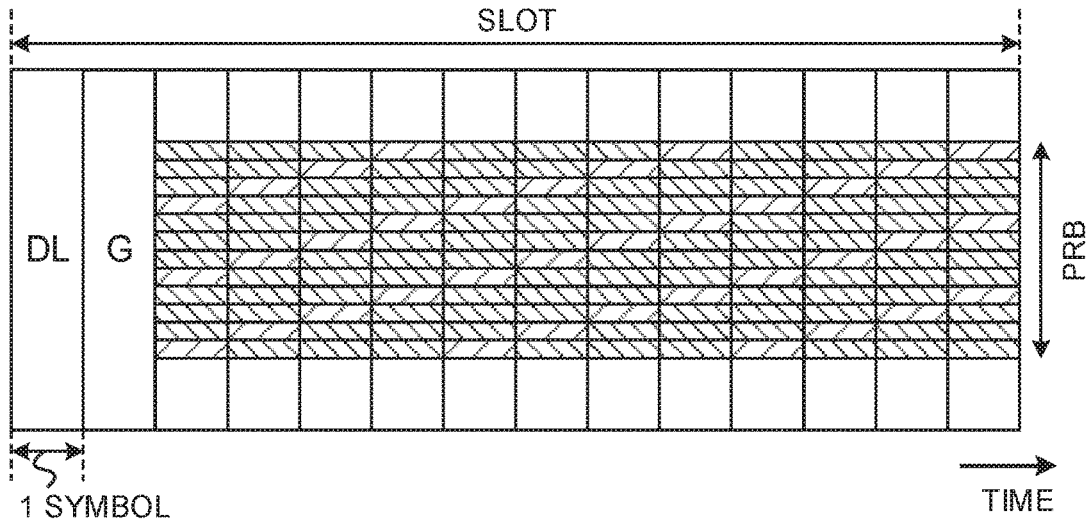
FIG. 4A to FIG. 4C are diagrams, each showing an example of the method of multiplexing UCI and RSs according to a first aspect of the present invention.
Figure 4B:
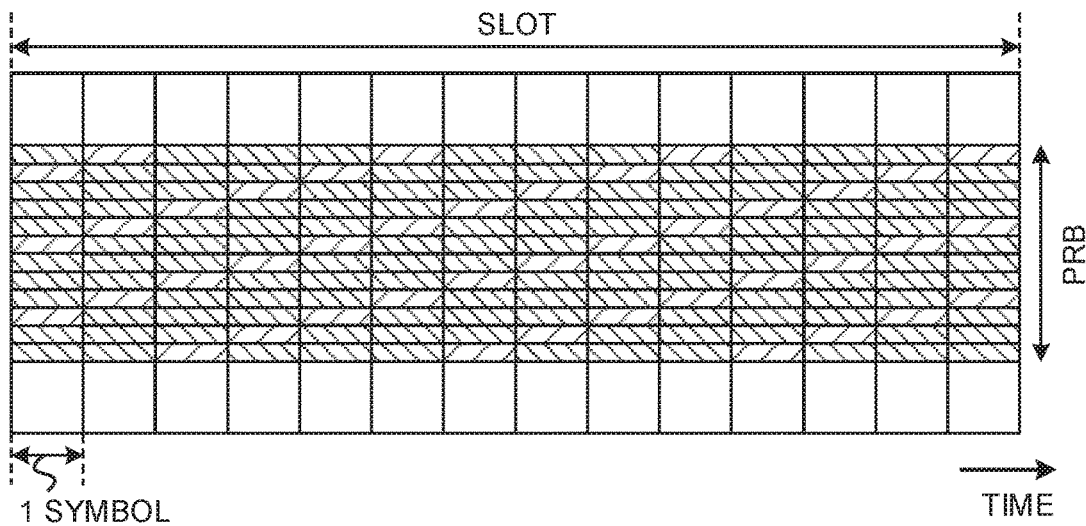

FIG. 4 show cases where the subcarriers for inserting DMRSs (DMRS subcarrier) are hopped (or dispersed, shifted, and so on) between different symbols. FIG. 4 show cases where the uplink control channel allocation field one PRB, and where three subcarriers out of the 12 subcarriers of each symbol are used to transmit DMRSs. In addition, FIG. 4A shows a case where a PUCCH (long PUCCH) is allocated to a UL-centric slot, while FIG. 4B shows a case where a PUCCH (long PUCCH) is allocated to a UL-only slot.

In UCI channel estimation, a base station may perform receiving processes (for example, two dimensional MMSE channel estimation) using not only the channel estimation results of DRMSs in the same symbol, but also the channel estimation results of DMRS in other symbols. In FIG. 4A and FIG. 4B, DMRSs are multiplexed on all subcarriers in one PRB by means of hopping, so that DMRS channel estimation results can be used in all subcarriers. By this means, even if the density of DMRSs is low, the accuracy of channel estimation can be improved adequately. Also, since the coding rate for UCI can be lowered by lowering the density of DMRSs, it is possible to reduce the degradation of communication quality.

Figure 4C:
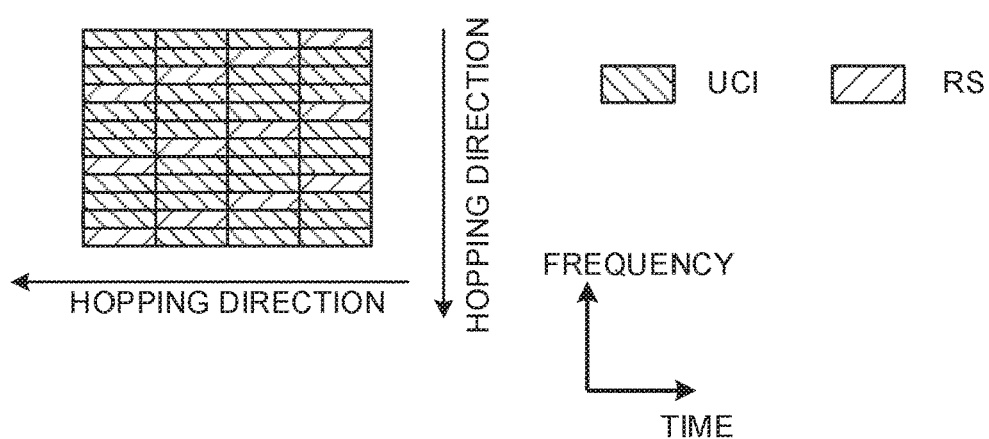

As for the method of hopping, predetermined hopping patterns may be applied, sequentially, from the last symbol or the first symbol in a predetermined time interval (for example, a slot). For example, a format may be adopted here in which the subcarriers for inserting DMRSs are shifted (hopped) forward in the time direction, by one subcarrier, in order, from the last symbol of the slot (see FIG. 4C). Although FIG. 4A and FIG. 4B show cases in which the hopping pattern shown in FIG. 4C is employed, this is by no means the only applicable hopping pattern.

As shown in FIG. 4, by defining the amount of hopping (or the amount of shift) for each symbol index, s possible to simplify the process of allocating DMRSs, and reduce the increase in the processing load on user terminals.

Although FIG. 4A and FIG. 4B show cases where DMRSs are arranged in all of the PUCCH symbols, the present embodiment s by no means limited to this. For example, a format may be adopted n which DMRSs are inserted in some of the symbols in the PUCCH allocation field (see FIG. 5).

Figure 5:
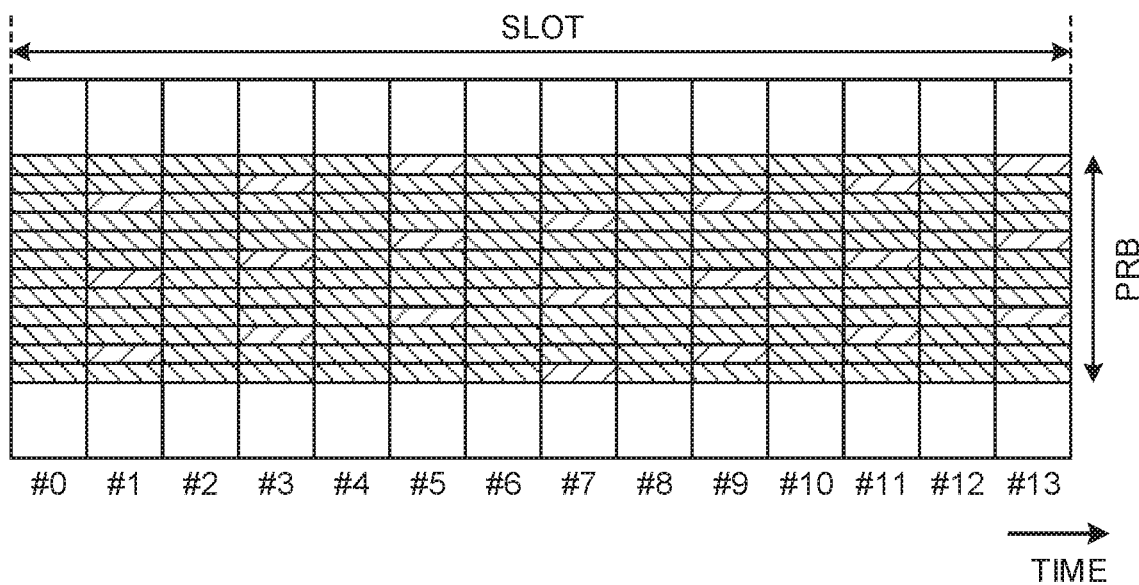
FIG. 5 is a diagram to show another example of the method of multiplexing UCI and RSs according to the first aspect.

FIG. 5 shows a case where DMRSs are placed in odd-numbered symbols in the PUCCH allocation field, and where the subcarriers for inserting DMRSs hop between symbols. This will lower the density of DMRSs (by increasing the resources for use for UCI) and lower the coding rate for UCI, so that, by the coding gain, the bit error rate performance can be improved.

FIG. 5 shows a case where the DMRS subcarriers hop forward in the time direction, in order, from the last symbol where an uplink control channel is allocated, but other hopping methods may be applied as well. In addition, the symbols for arranging DMRSs are not limited to odd-numbered symbols and can be even-numbered symbols, or DMRSs can be arranged at intervals of two or more symbols.

Figure 6A:
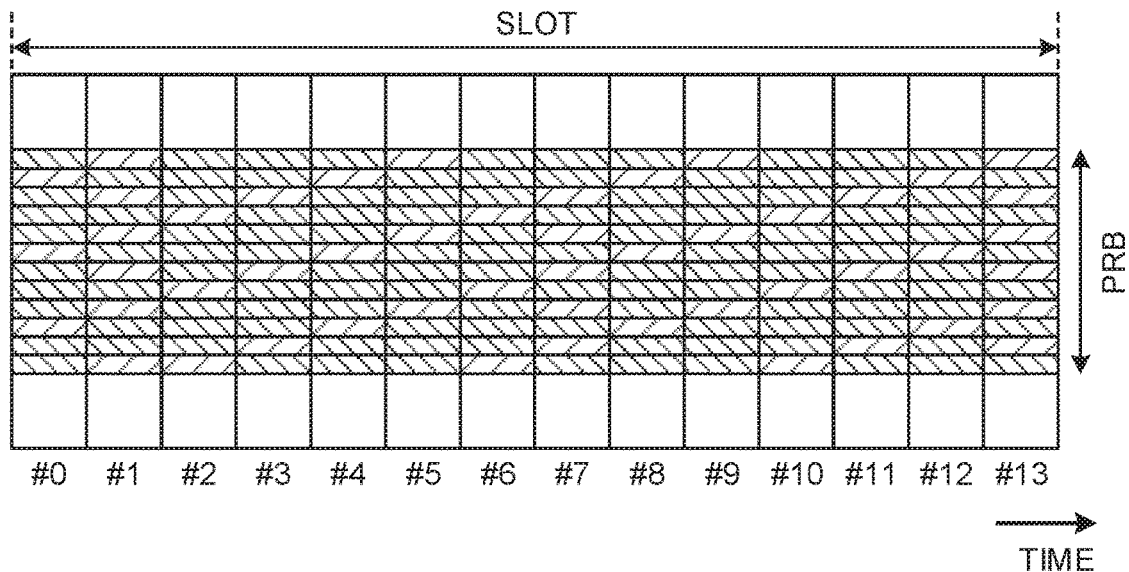
FIG. 6A and FIG. 6B are diagrams, each showing another example of the method of multiplexing UCI and RSs according to the first aspect.
Figure 6B:
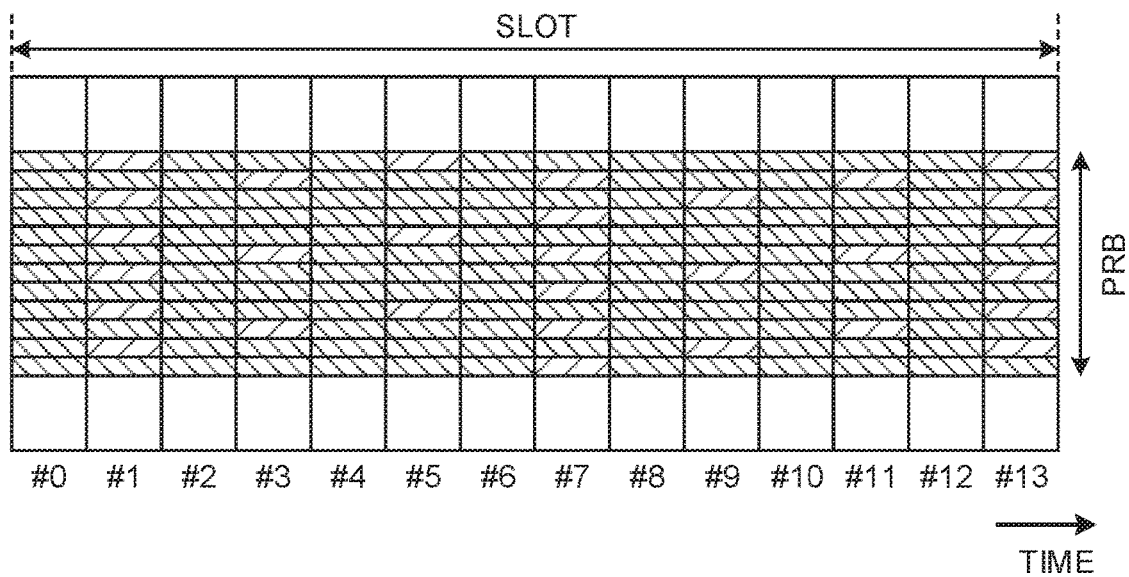

Alternatively, a format may be here adopted in which the density of DMRSs varies per symbol in a slot where a PUCCH is allocated (see FIG. 6). For example, in the PUCCH allocation field, the DMRS density in predetermined symbols is made higher than the DMRS density in other symbols. In the case shown in FIG. 6A, when DMRSs are multiplexed over all symbols in the PUCCH allocation field, the DMRS density in predetermined symbols (here, #1, #7 and #13) is made higher than the DMRS density in the other symbols. In the case shown in FIG. 6B, when DMRSs are multiplexed over some of the symbols in the PUCCH allocation field, the DMRS density in predetermined symbols (here, #1, #7 and #13) among the symbols for allocating DMRSs is made higher than the DMRS density in the other symbols.

Thus, by increasing the density of DMRSs in predetermined symbols, it is possible to increase the accuracy of channel estimation in these predetermined symbols, in a selective manner, and to improve the bit error rate performance. For example, the number of subcarriers in which DMRSs are inserted can be made higher in symbols where predetermined information (for example, HARQ-ACK, etc.) in UCI is allocated, or in adjacent symbols thereof, than in other symbols. This makes it possible to improve the accuracy of channel estimation for UCI, which tends to degrade the quality of communication, so that it is possible to effectively reduce the degradation of communication quality.

Furthermore, by increasing the density of DMRSs in predetermined symbols, it is possible to increase the accuracy of channel estimation in these predetermined symbols, in a selective manner, and to transmit and receive a larger number of information bits, so that the efficiency of use of resources can be improved. For example, it may be possible to make the number of subcarriers for inserting DMRSs greater in symbols where a larger number of information bits are allocated, or in adjacent symbols, than in other symbols, by increasing the coding rate and the modulation order in UCI. By this means, it is possible to transmit and receive a larger number of information bits using symbols where the accuracy of channel estimation is high, so that the efficiency of use of resources can be improved.

Figure 7:
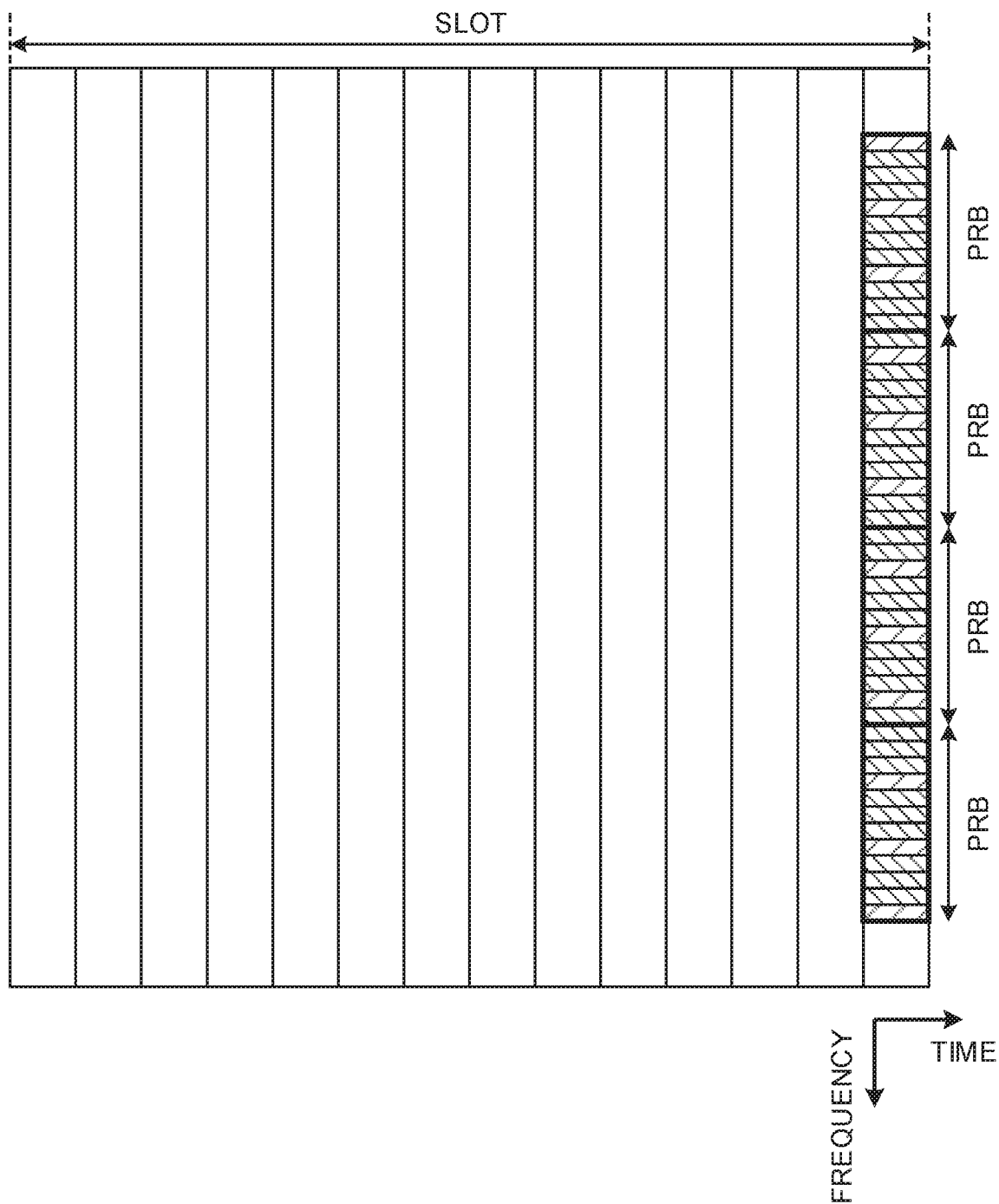
FIG. 7 is a diagram to show another example of the method of multiplexing UCI and RSs according to the first aspect.

Furthermore, a format may be adopted here in which the subcarriers for inserting DMRSs are hopped per predetermined frequency block (for example, per resource block). FIG. 7 shows a case where a PUCCH is placed in multiple PRBs (here, four PRBs) within one symbol (in this case, the last symbol) in the slot. In addition, in the case shown here, DMRSs are multiplexed over some (here, three subcarriers) of the multiple frequency resources (for example, subcarriers) included in each PBR.

In this case, the subcarriers for inserting DMRSs hop (shift) between different PRBs. Although FIG. 7 shows a case where the DMRS subcarriers hop sequentially in the frequency index direction as an example of a hopping method, the hopping method is by no means limited to this. Also, although, in the case shown here, three DMRS subcarriers are multiplexed in each PRB, the number of DMRS subcarriers is by no means limited to this. Also, the number of DMRS subcarriers may be configured to vary between different PRBs.

Also, when a PUCCH is allocated over multiple symbols (for example, when a long PUCCH is used), a user terminal may apply frequency hopping per predetermined period within a slot (for example, per mini (sub) slot).

Figure 8:
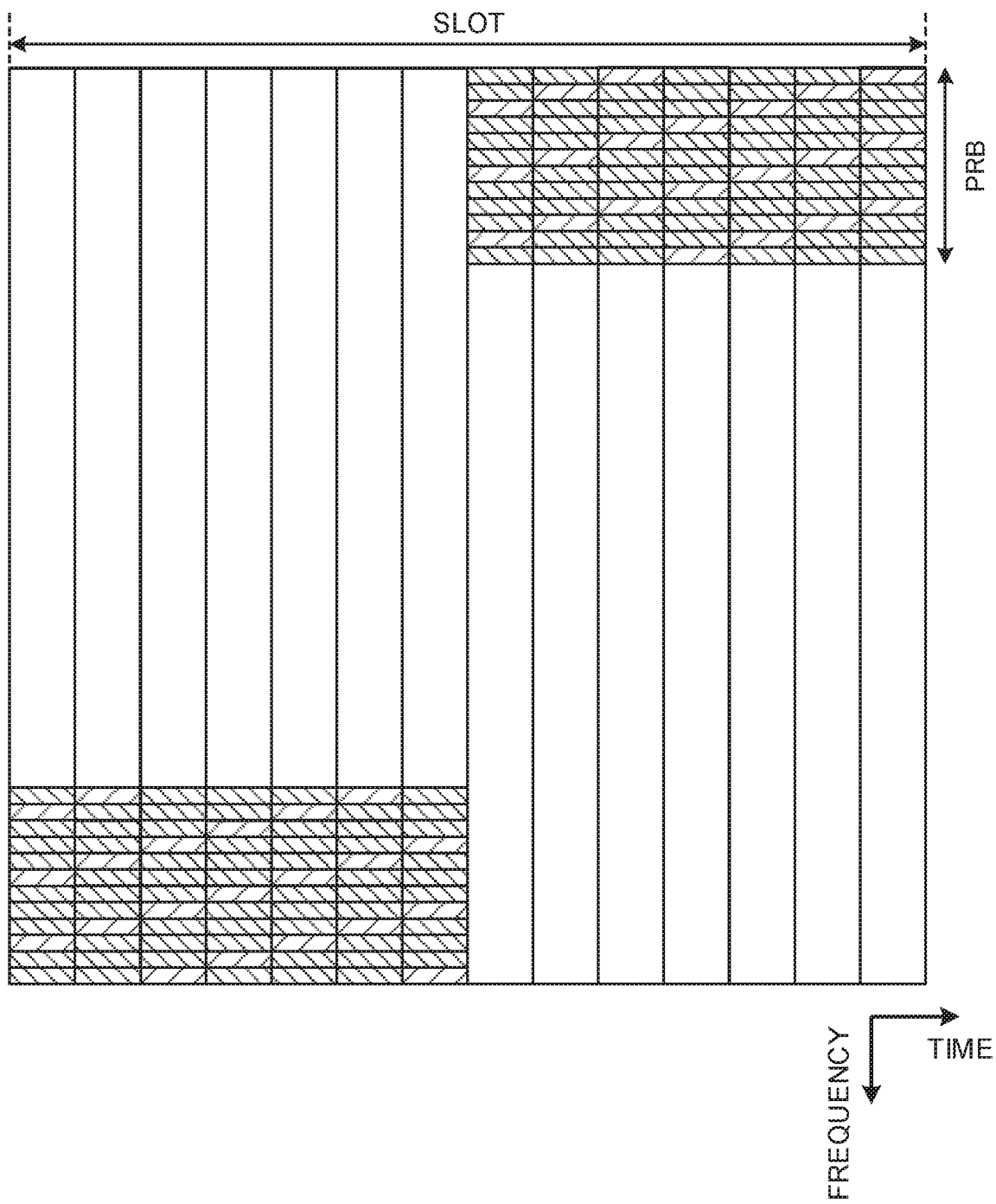
FIG. 8 is a diagram to show another example of the method of multiplexing UCI and RSs according to the first aspect.

FIG. 8 shows a case where frequency hopping is applied at the timing the number of transmission symbols becomes equal (for example, seven symbols if there are fourteen symbols per slot) before and after frequency hopping. In this case, a format is adopted in which the subcarriers for inserting DMRSs hop between different symbols. Furthermore, a format may be employed, here in which the positions where the DMRS subcarriers are arranged are the same or different between the PUCCH allocation fields assigned to different PRBs (before and after frequency hopping). In the case shown in FIG. 8, a format is employed in which the DMRS subcarriers hop forward, in order, from the last symbol in the PUCCH allocation field, and in which the DMRS subcarriers are arranged in different positions between PUCCH allocation fields assigned to different PRBs.

Figure 9:
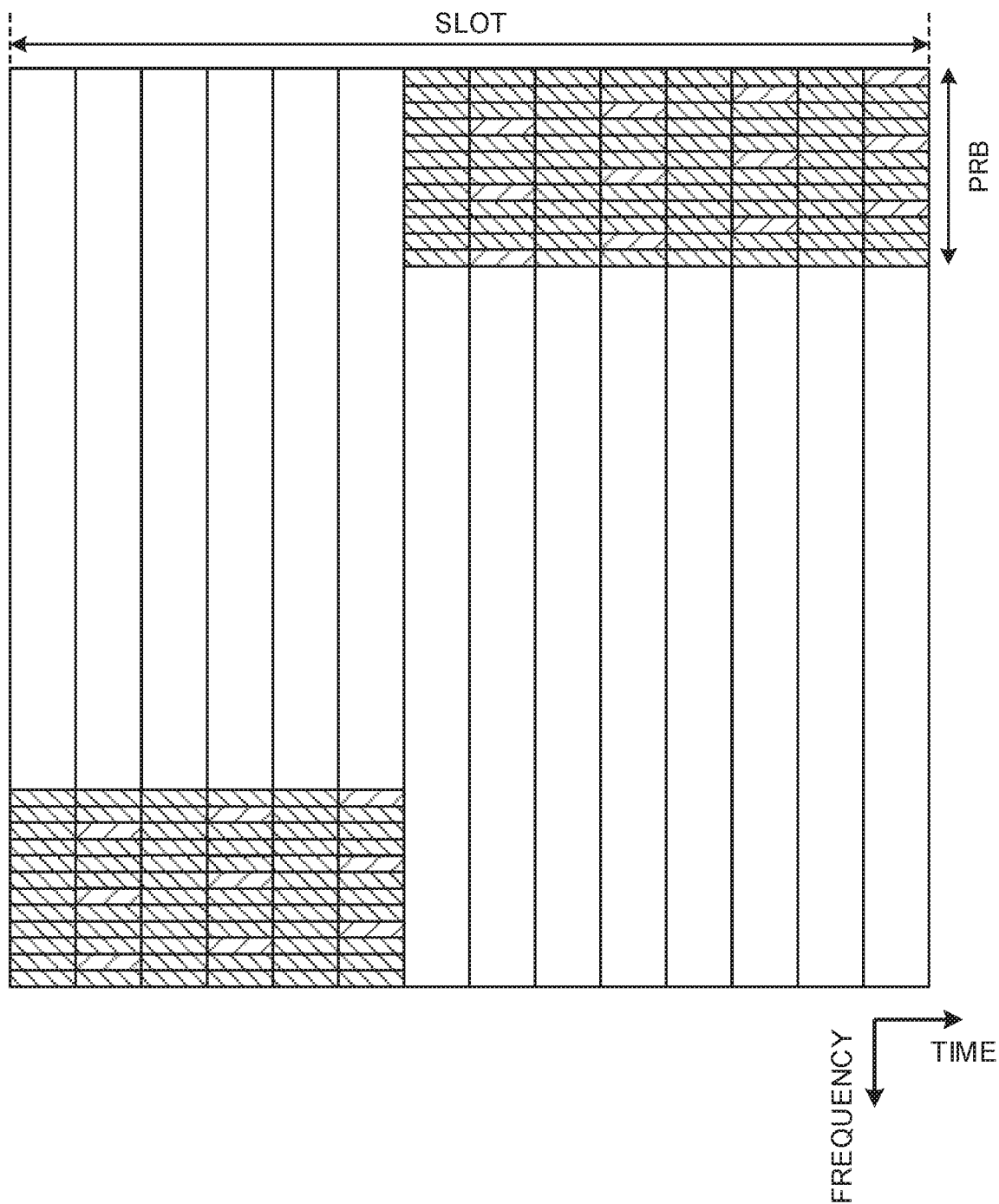
FIG. 9 is a diagram to show another example of the method of multiplexing UCI and RSs according to the first aspect.

FIG. 9 shows a case where frequency hopping is performed at the timing the number of symbols becomes uneven before and after frequency hopping. Here, a case is shown, in which, when there are fourteen symbols per slot, the PUCCH allocation field is formed with six symbols in the first half and eight symbols in the second half. Also, a format may be employed here in which the number of symbols for allocating DMRSs is the same or different between PUCCH allocation fields assigned to different PRBs. Also, DMRS subcarriers may be configured in some of the symbols in the PUCCH allocation field. In this way, multiplexing of UCI can be controlled flexibly by permitting formats in which the number of symbols before and after frequency hopping and/or the number of DMRS subcarriers vary.

Figure 10:
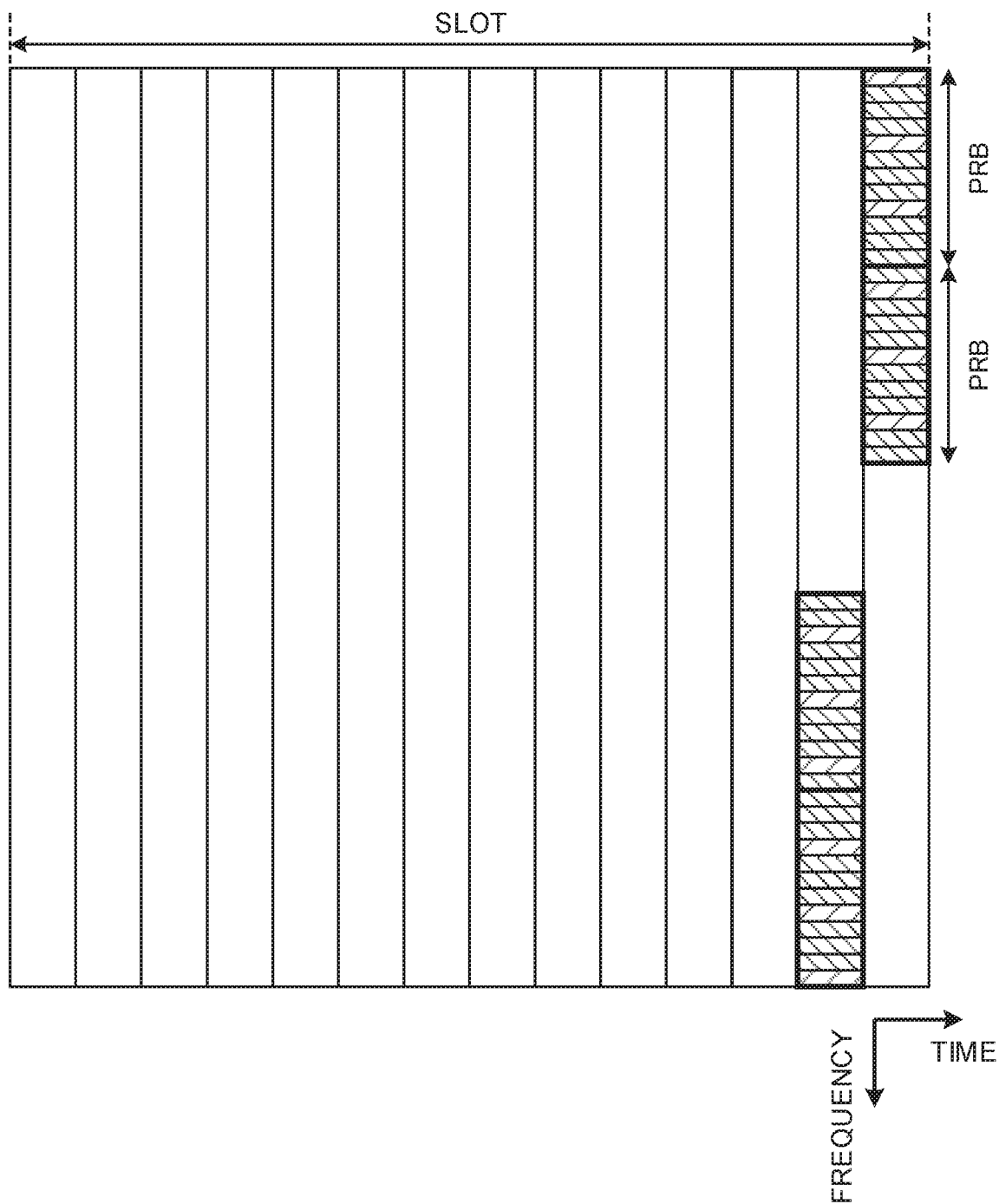
FIG. 10 is a diagram to show another example of the method of multiplexing UCI and RSs according to the first aspect.
Figure 11A:
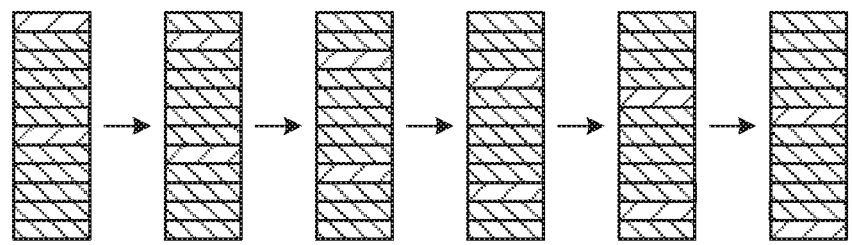
FIG. 11A to FIG. 11D are diagrams, each showing an example of the number of DMRS subcarriers and a hopping pattern.
Figure 11B:
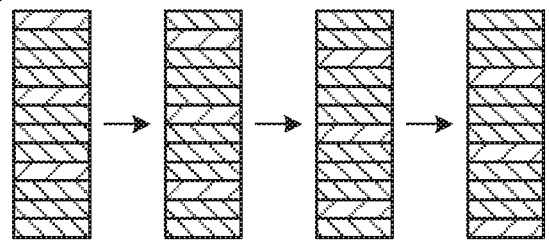
Figure 11C:
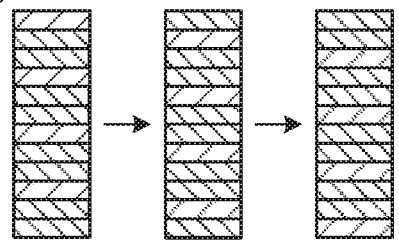
Figure 11D:
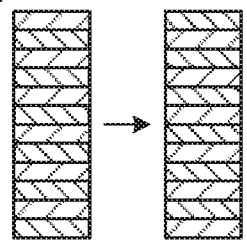

FIG. 10 shows a case where, when a short PUCCH is employed, frequency hopping is applied every predetermined period (for example, every one symbol) within a slot. FIG. 10 shows a case where a PUCCH that is comprised of two PRBs is subjected to frequency hopping in two symbols (the last symbol and the symbol that is one symbol before). In this case, the DMRS subcarriers may be hopped between different PRBs of each symbol. Also, a format may be employed here in which the hopping pattern of DMRS subcarriers in each PRB is the same or different between symbols (before and after frequency hopping). FIG. 10 shows a case where the DMRS subcarriers hop forward, in order, from the last symbol where the PUCCH is allocated, along the frequency index direction.

In this way, by making the DMRS subcarriers hop between different symbols, and by making; the PUCCH-allocating frequency field (PRB or PRB group) hop along the frequency direction, it is possible to effectively improve the accuracy of channel estimation. In this way, the deterioration of communication quality can be effectively reduced.

<User Terminal Operation>

A user terminal can employ the frequency hopping pattern of DMRS subcarriers (see FIGS. 4 to 7) and/or the frequency hopping pattern of the PUCCH allocation field (for example, PRBs) (see FIGS. 8 to 10) based on predetermined conditions. A format may be adopted here in which the hopping pattern of DMRS subcarriers and/or the frequency hopping pattern of the PUCCH allocation field are stipulated in advance in the specification, or reported to the user terminal.

For example, a format may be adopted here, in which a hopping pattern is defined for every number of DMRS-allocating subcarriers, and in which the hopping pattern to be employed by a user terminal is reported from the network (for example, a base station). In this case, the user terminal may receive information about the number f DMRS subcarriers to be multiplexed with UCI from the base station, and use the predetermined hopping pattern that is associated with the number of subcarriers received. The number of DMRS subcarriers may be the density of DMRSs and/or the interval between DMRSs. For the reporting from the base station to the user terminal, at least one of the broadcast signal, higher layer signaling and physical layer signaling is used.

FIG. 11 show examples of the relationship between the number of DMRS subcarriers arranged in a PRB (for example, 12 subcarriers) and the hopping pattern. Here, hopping patterns are shown, in which a shift of one subcarrier is applied to each number of DMRS subcarriers. To be more specific, when the number of DMRS subcarriers is two, six types of hopping patterns are defined (see FIG. 11A). Likewise, four types of hopping patterns are defined when the number of DMRS subcarriers is three (see FIG. 11B), three types of hopping patterns are defined when the number of DMRS subcarriers is four (see FIG. 11C), and two types of hopping patterns are defined when the number of DMRS subcarriers is six (see FIG. 11D). Of course, the DMRS subcarriers and hopping patterns are not limited to these.

The base station reports information about the number of DMRS subcarriers to the user terminal, and, based on the reported information, the user terminal makes the DMRS hop, and performs PUCCH transmission. When the PUCCH format to apply to the user terminal is reported from the base station, a format may be adopted in which information about the hopping pattern (for example, the number of DMRS subcarriers) to be applied is reported together.

(Second Aspect)

With a second aspect of the present invention, the reference signal sequences to apply to the DMRSs described in the first example will be described (the frequency resources where DMRSs are multiplexed).

<Base Sequence>

The base sequence (RS base sequence) to apply to DMRSs may be a CAZAC (Constant Amplitude Zero Auto-Correlation) sequence (for example, a Zadoff-Chu sequence), or may be a sequence conforming to a CAZAC sequence, such as that specified in 3GPP TS 36.211 Table 5.5.1.2-1, Table 5.5.1.2-2 and so on (CG-CAZAC (computer generated CAZAC) sequence).

Furthermore, the base sequence to apply to UCI (UCI data base sequence) may be a sequence modulated by a predetermined method (BPSK, QPSK, etc.). For example, the data base sequence may be a CAZAK sequence and/or a sequence conforming to a CAZAK sequence, like the RS base sequence. Alternatively, the data base sequence may be a real number sequence (for example, 1+i0), not a CAZAC sequence.

Orthogonal spreading may be applied to the RS sequence to apply to reference signals and/or the UCI data sequence to apply to UCI. As a result of this, it is possible to share (multiplex) a plurality of user terminals that use the same frequency and time resources, so that the efficiency of use of resources can be improved.

<Allocation of RS Base Sequence to RS Subcarriers>

The RS base sequence may be allocated to RS subcarriers within a PRB (intra-PRB) or across multiple PRBs (inter-PRB). Alternatively, the RS base sequence may be allocated to RS subcarriers within a symbol or across multiple symbols. Note that the case where the RS base sequence is allocated within a symbol may be referred to as "intra-PRB," and the case where the RS base sequence is allocated across a plurality of symbols may be referred to as "inter-PRB."

<Intra-PRB>

Figure 12A:
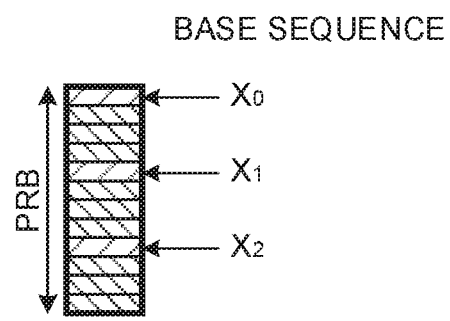
FIG. 12A and FIG. 12B are diagrams, each showing a sample base sequence to apply to UCI according to a second aspect of the present invention.

FIG. 12 show examples of the case of allocating RS base sequences on an intra-PRB basis. In intra-PRB, m base sequences (for example, $X_0, X_1, \ldots X_{m-1}$) are generated (sequence length m) and allocated to the RS subcarriers in PRBs. m is the number of RS subcarriers in a PRB. Since, in FIG. 12A, three RS subcarriers are contained in one PRB, base sequences $X_0$, $X_1$ and $X_2$ (sequence length 3) may be applied to these RS subcarriers.

Figure 12B:
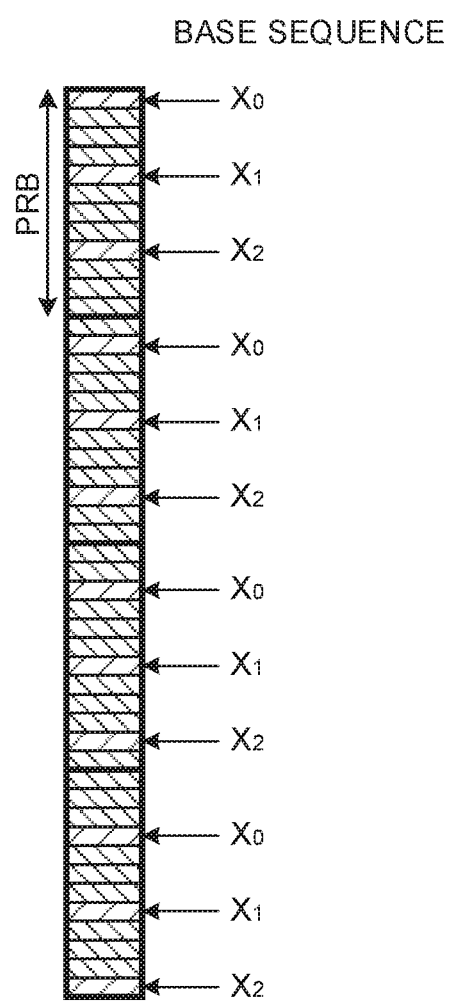

When a PUCCH is placed across different PRBs, the same base sequence applied to RS subcarriers contained in different PRBs. FIG. 12B shows a case where the PUCCH allocation field is four PRBs and where each PRB contains three RS subcarriers. Also, inter-PRB hopping is applied to the RS subcarriers in each PRB. In this case, the same base sequences (for example, $X_0$, $X_1$ and $X_2$) are applied to the RS subcarriers in each PRB. Furthermore, the positions (hopping pattern) in each PRB where the RS subcarriers are arranged can be made common between user terminals.

Thus, by applying the same base sequences in PRBs, even when the number of PRBs to allocate the PUCCH varies among a plurality of user terminals, it is still possible to perform PUCCH transmission by suitably multiplexing different user terminals, so that the flexibility of scheduling can be improved.

Figure 13:
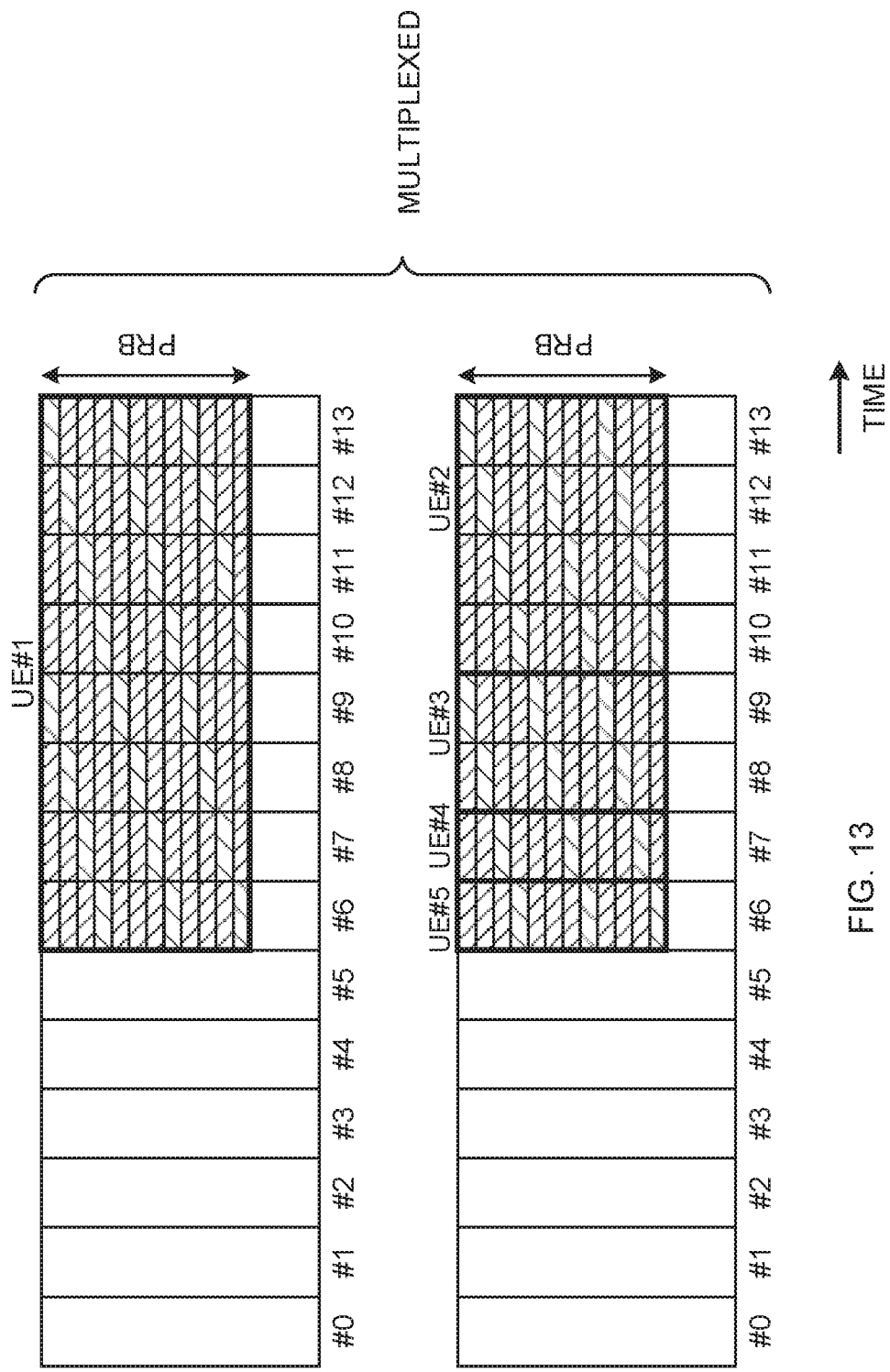
FIG. 13 is a diagram to show other sample base sequences to apply to UCI according to the second aspect.

FIG. 13 shows a case where a PUCCH is allocated to a predetermined period (eight symbols) in a slot, and one PRB. In the case shown here, to multiplex UCI and RSs, UE #1 uses eight symbols (#6 to #13), UE #2 uses four symbols (#10 to #13), UE #3 uses two symbols (#8 and #9), UE #4 uses one symbol (#7), and UE #5 uses one symbol (#8).

In this case, the same RS base sequences are applied to the RS subcarriers in each symbol. Furthermore, the positions (hopping pattern) in each PRB where the RS subcarriers are arranged care be made common between user terminals. By this means, even when the number of symbols to allocate the PUCCH varies among a plurality of user terminals, it is possible to perform PUCCH transmission by suitably multiplexing different user terminals, so that flexible resource allocation is made possible.

Note that, in FIG. 12 and FIG. 13, the UCI may be applied [→may apply?] CAZAC and/or orthogonal spreading, and multiplexed by CDM.

<Inter-PRB>

FIG. 14 show examples of cases of allocating RS base sequences on an inter-PRB basis. In inter-PRB, N×m base sequences (for example, $X_0, X_1, \ldots X_{(N \times m)-1}$) are generated (sequence length N×m), and allocated to the RS subcarriers in all the PRBs where the PUCCH is allocated. m is the number of RS subcarriers in one PRB, and N is the number of frequency blocks (for example, PRBs) where the PUCCH is allocated. Note that N may be determined, taking into account only the number of PRBs in the frequency direction, or may be the sum of the number of PRBs in the frequency direction and in the time direction (the number of symbols). For example, when two PRBs are arranged in the frequency direction and one PRB is formed with fourteen symbols, N, which is the number of all PRBs, may be two, or N may be set to 28 (=2×14) to generate RS base sequences.

Alternatively, instead of allocating different RS base sequences to the RS subcarriers in all of the PRBs where the PUCCH is allocated, the allocation of base sequences may be controlled within predetermined frequency groups (for example, PRB groups). In this case, K×m base sequences (for example, $X_0, X_1, \ldots X_{(K \times m)-1}$) are generated (sequence length K×m) and allocated to the RS subcarriers in some of the PRB groups where the PUCCH is allocated. m is the number of RS subcarriers in one PRB, and K is the number of PRBs in a PRB group. Note that K may be determined taking into account only the number of PRBs in the frequency direction in the PRB groups, or K may be set to the sum of the number of PRBs in the frequency direction and in the time direction (the number of symbols). For example, when two PRBs are arranged along the frequency direction in a PRB group and one PRB is formed with seven symbols, K, which is the number of PRBs in the PRB group, may be two, or K may be set to 14 (=2×7) to generate RS base sequences.

Figure 14B:
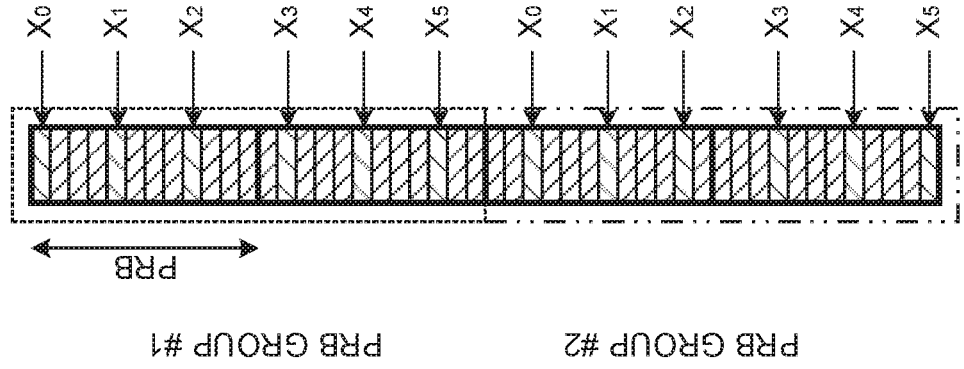
FIG. 14A and FIG. 14B are diagrams, each showing another sample base sequence to apply to UCI according to the second aspect.
Figure 14A:
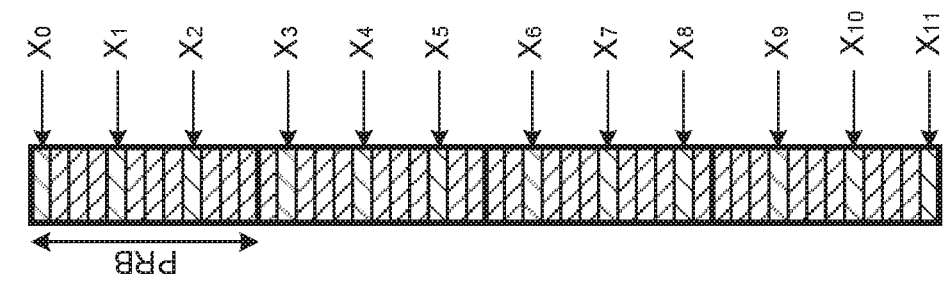

FIG. 14A shows a case where the PUCCH allocation field is four PRBs and each PRB contains three RS subcarriers. In addition, inter-PRB hopping is applied to the RS subcarriers in each PRB. In this case, different base sequences (for example, $X_0$ to $X_1$) are applied to the RS subcarriers in all of the PRBs where the PUCCH is allocated. Furthermore, the positions (hopping pattern) in each PRB where the RS subcarriers are arranged can be made common between user terminals.

Thus, by increasing the number of RS base sequences (by making the sequence length longer), more user terminals can be suitably multiplexed, so that it is possible to improve the efficiency of use of resources.

FIG. 14B shows a case where the PUCCH allocation field is four PRBs and each PRB contains three RS subcarriers. In addition, inter-PRB hopping is applied to the RS subcarriers in each PRB. In addition, a case is shown here where a PRB group, which serves as the unit for allocating RS base sequences, is comprised of two PRBs.

In this case, the same base sequences (for example, $X_0$ to $X_5$) are applied to the RS subcarriers in the PRB groups (here, two PRBs). Furthermore, the positions (hopping pattern) in each PRB group where the RS subcarriers are arranged can be made common between user terminals.

Thus, by increasing the number of RS base sequences (by making the sequence length longer), more user terminals can be suitably multiplexed, so that it is possible to improve the efficiency of use of resources. Also, by applying RS base sequences on a per PRB group basis, it is possible to multiplex user terminals suitably, on a per PRB group basis, even when the PRBs to which the PUCCHs is allocated are not all the same, so that flexible resource allocation is made possible.

Figure 15:
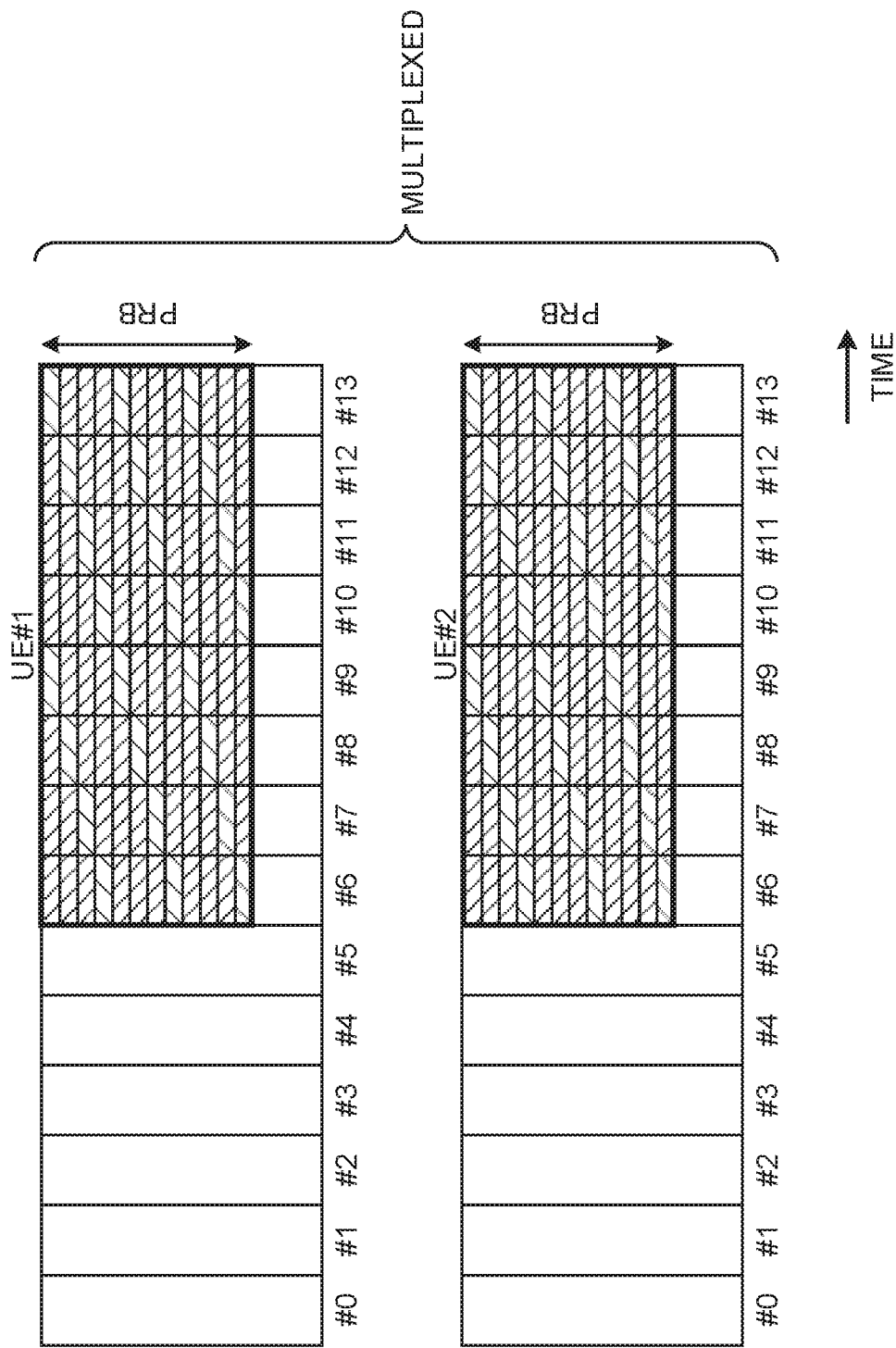
FIG. 15 is a diagram to show other sample base sequences to apply to UCI according to the second aspect.

FIG. 15 shows a case where a PUCCH is allocated to a predetermined period (eight symbols) in one slot, and one PRB. Here, a case is shown in which UE #1 and UE #2 multiplex UCI and RSs using eight symbols (#6 to #13).

In this case, different RS base sequences are applied to the RS subcarriers in symbols #6 to #13, Furthermore, the positions (hopping pattern) in each symbol where the RS subcarriers are arranged can be made common between user terminals. By this means, although user terminals have to be multiplexed only in PRB units, the number of base sequences can be increased, so that it is possible to increase the number of user terminals that can be suitably multiplexed. This makes it possible to increase the efficiency of use of resources.

Figure 16:
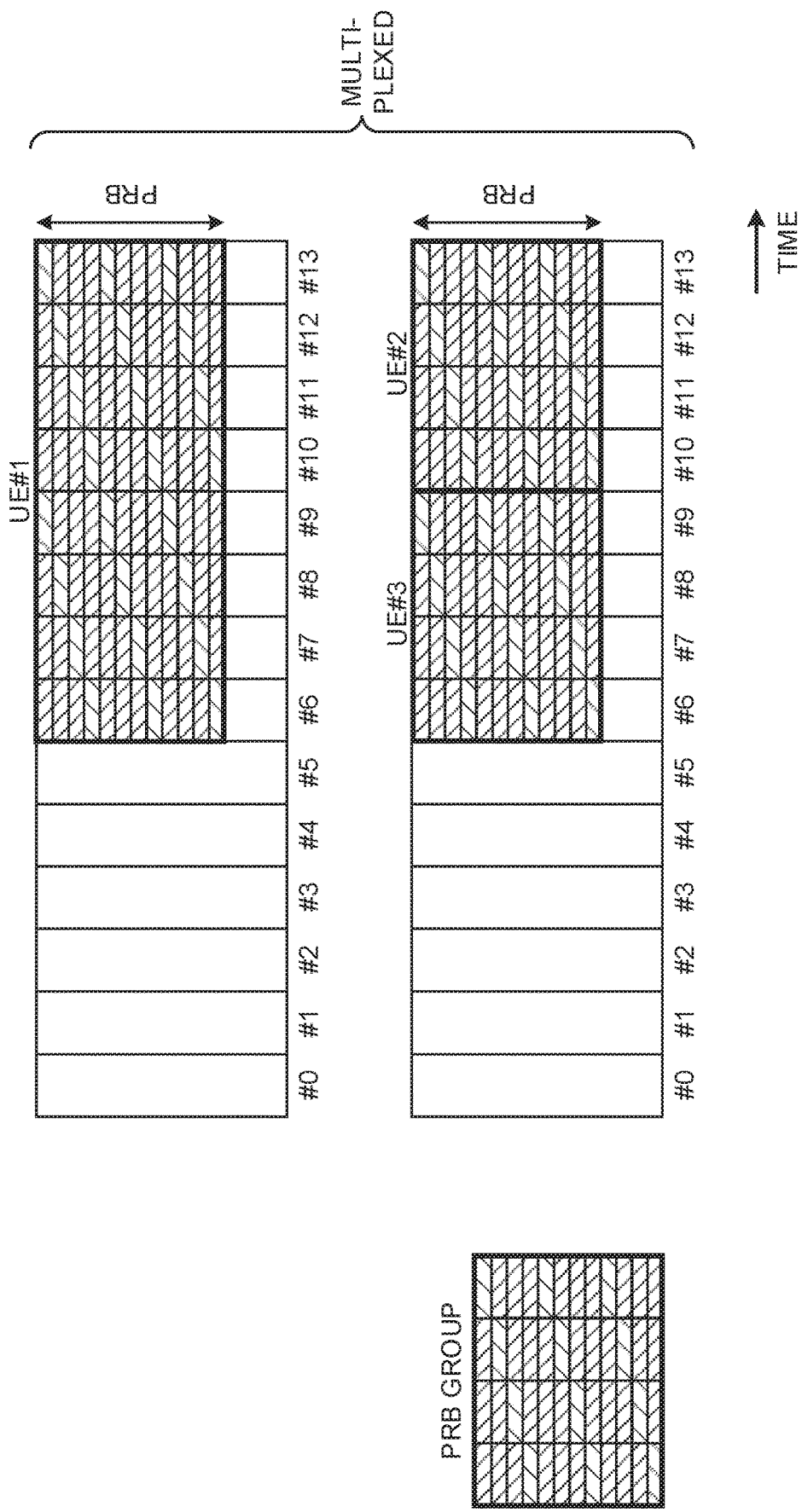
FIG. 16 is a diagram to show other sample base sequences to apply to UCI according to the second aspect.

FIG. 16 shows a case where a PUCCH is allocated to a predetermined period (eight symbols) within one slot, and one PRB. He e, a case is shown in which, to multiplex UCI and RSs, UE #1 uses eight symbols (#6 to #13), UE #2 uses four symbols (#10 to #13) and UE #3 uses four symbols (#6 to #9). In addition, a case is shown here in which symbols #6 to #9 and symbols #10 to #13 each constitute a PRB group.

In this case, different RS base sequences are applied to the RS subcarriers of symbols #6 to #9. Similarly, different RS base sequences are applied to the RS subcarriers of symbols #10 to #13. The positions (hopping pattern) in the symbols in each PRB group where the RS subcarriers are arranged can be made common between user terminals. In this way, user terminals can be multiplexed on a per PRB group basis. Also, since the number of base sequences can be increased compared with intra-PRB, it is possible to increase the number of user terminals that can be suitably multiplexed. This makes it possible to increase the efficiency of use of resources.

<User Terminal Operation>

Figure 17:
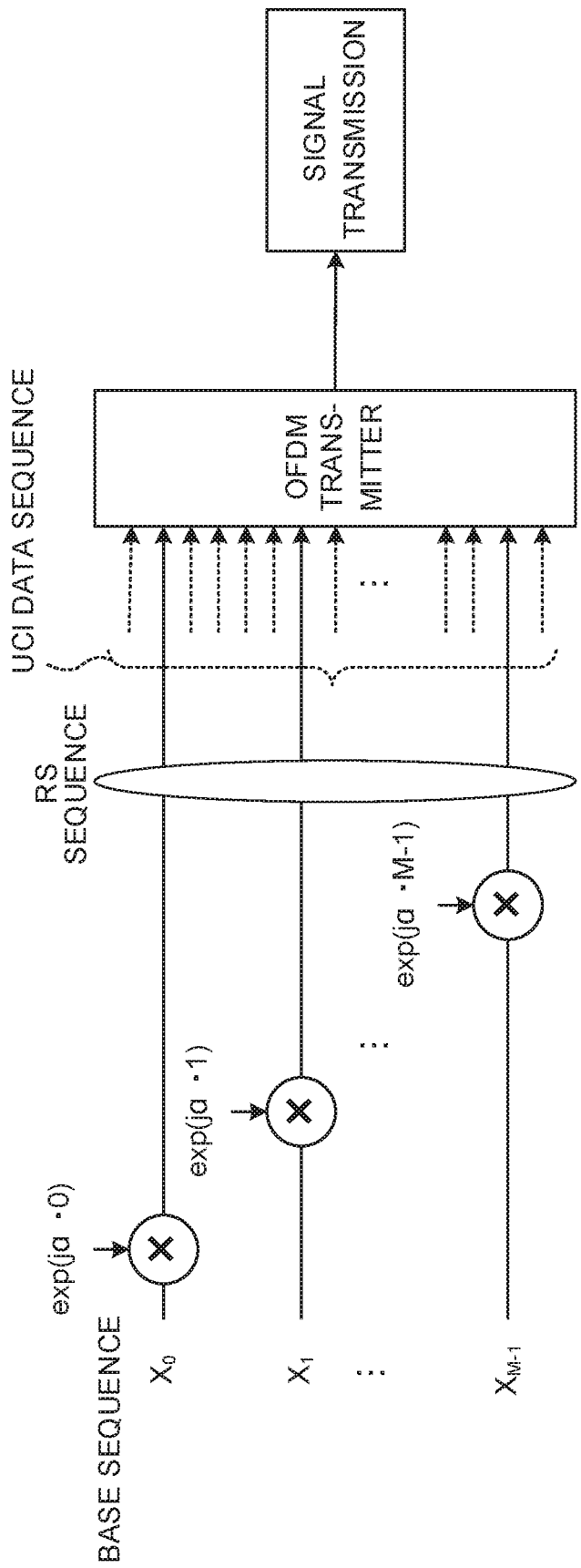
FIG. 17 is a diagram to show an example of the operation of a user terminal according to the second aspect.

FIG. 17 shows an example of the signal (PUCCH) generation/transmission operation in a user terminal. The user terminal generates an RS sequence based on a predetermined base sequence and the amount of phase rotation for this base sequence. For example, when the number of base sequences is M, RS sequences can be generated by applying predetermined amounts of phase rotation) to base sequences $X_0, X_1, \ldots X_{M-1}$. Then, the user terminal frequency-multiplexes (FDM) the RS sequences that are generated, with UCI data sequences, and transmits signals (PUCCH). Furthermore, the user terminal transmits signals by hopping the RS-allocating subcarriers between different symbols and/or different resource blocks.

Information about the RS base sequences and/or the amount of phase rotation may be reported from the base station to the user terminal in advance via higher layer signaling and so on.

As described above, when a PUCCH is transmitted, the subcarriers to allocate RSs are hopped, so that, without increasing the density of DMRSs, the deterioration of communication quality can be reduced by using DMRSs that are distributed by hopping for channel estimation. As a result of this, the degradation of communication quality can be reduced even when UL control channels of different formats than existing systems are supported.

(Radio Communication System)

Now, the structure radio communication system according to the present embodiment will be described below. In this radio communication system, each radio communication method according to the above-described embodiments is employed. Note that the radio communication methods according to the herein-contained aspects of the present invention may be applied individually, or two or more of them may be combined and applied.

Figure 18:
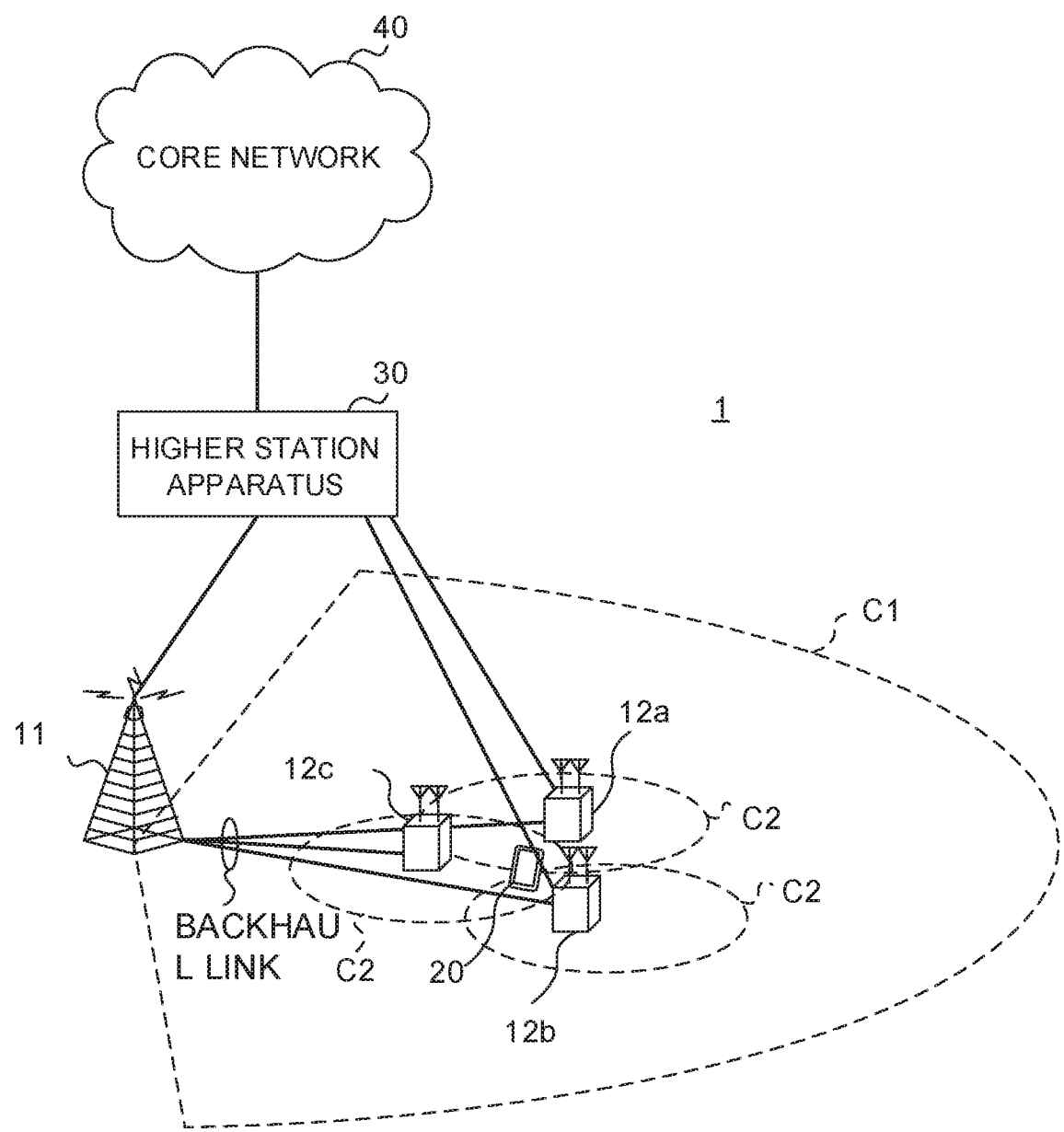
FIG. 18 is a diagram to show an example of a schematic structure of a radio communication system according to the present embodiment.

FIG. 18 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. The radio communication system 1 may be also referred to as "SUPER 3G," "LTE-A (LTE-Advanced)," "IMT-Advanced," "4G," "5G," "FRA (Future Radio Access)," "NR (New RAT: New Radio Access Technology)," and so on.

The radio communication system 1 shown in FIG. 18 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells and/or within cells may be adopted.

Here, "numerology" refers to communication parameters in the frequency direction and/or the time direction (for example, at least one of the subcarrier spacing (subcarrier interval), the bandwidth, the symbol duration, the time duration of CPs (CP duration), the subframe duration, the time duration of TTIs (TTI duration), the number of symbols per TTI, the radio frame structure, the filtering process, the windowing process, and so on). In the radio communication system 1, for example, subcarrier spacing of, for example, 15 kHz, 30 kHz, 60 kHz, 120 kHz and 240 kHz may be supported.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Furthermore, in each cell (cam) a single numerology may be employed, or a plurality of different numerologies may be employed.

Between the user terminals 20 and the radio base station 11, communication can be carried out using a carrier of a relatively low frequency band (for example, 2 GHz) and a narrow bandwidth (referred to as an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," "central node," an "eNB (eNodeB)," a "gNB (gNodeB)," a "transmitting/receiving point (TRP)" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "eNBs," "gNBs," "transmitting/receiving points (TRPS)" and so on. Hereinafter the radio base stations 11 and 12 will be collectively referred to as"radio base stations 10," unless specified otherwise.

The user terminals 20 are terminals to support various communication schemes such as LTE, LTE-A, 5G, NR and so on, and may be either mobile communication terminals or stationary communication terminals. Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

Also, in the radio communication system 1, a multicarrier waveform (for example, the OFDM waveform) may be used, or a single-carrier waveform (for example, the DFT-s-OFDM waveform) may be used.

In the radio communication system 1, a DL shared channel (PDSCH (Physical Downlink Shared CHannel), which is also referred to as, for example, a "DL data channel"), which is used by each user terminal 20 on a shared basis, a broadcast channel (PBCH (Physical Broadcast CHannel)), L1/L2 control channels and so on, are used as DL channels. User data, higher layer control information and SIBs (System Information Blocks) are communicated in the PDSCH. Also, the MIB (Master Information Block) is communicated in the PBCH.

The L1/L2 control channels include DL control channels (a PDCCH (Physical Downlink Control CHannel), an EPDCCH (Enhanced Physical Downlink Control CHannel) and so on), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. It is possible to communicate HARQ retransmission control information (ACK/NACK) in response to the PUSCH using at least one of the PHICH, the PDCCH and the EPDCCH.

In the radio communication system 1, a UL shared channel (PUSCH: Physical Uplink Shared CHannel, which is also referred to as "UL data channel" and so on), which is used by each user terminal 20 on a shared basis, a UL control channel (PUCCH: Physical Uplink Control CHannel), a random access channel (PRACH: Physical Random Access CHannel) and so on are used as UL channels. User data, higher layer control information and so on are communicated by the PUSCH. Uplink control information (UCI), including at least one of DL signal retransmission control information (A/N), channel state information (CSI) and so on, is communicated in the PUSCH or the PUCCH. By means of the PRACH, random access preambles for establishing connections with cells are communicated.

<Radio Base Station>

Figure 19:
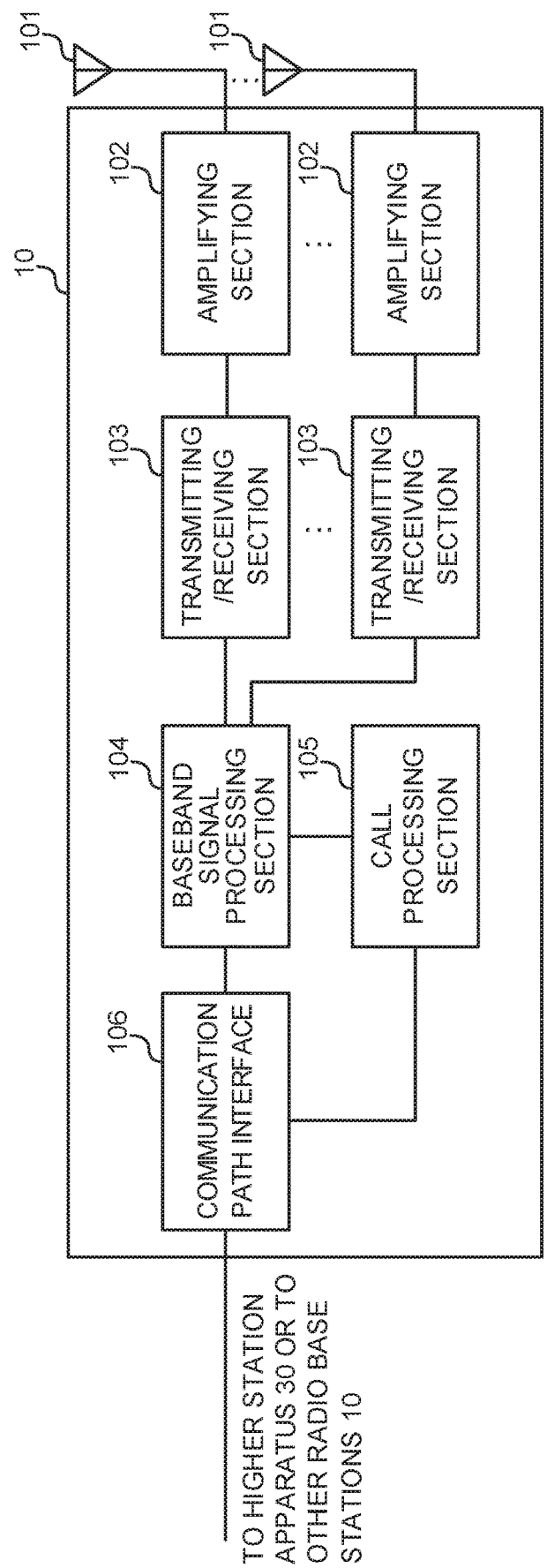
FIG. 19 is a diagram to show an ample of an overall structure of a radio base station according to the present embodiment.

FIG. 19 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on DL is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process scheduling, transport format selection, channel coding, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted, into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.).

In addition, the transmitting/receiving sections 103 transmit DL signals (including at least one of a DL data signal, a DL control signal and a DL reference signal) to the user terminal 20, and receive UL signals (including at least one of a UL data signal, a UL control signal and a UL reference signal) from the user terminal 20.

Furthermore, the transmitting/receiving sections 103 receive UCI from the user terminal 20 via a UL data channel (for example, the PUSCH) or a UL control channel (for example, a short PUCCH and/or a long PUCCH). This UCI may include at least one of HARQ-ACK, CSI and SR pertaining to the DL data channel (for example, the PDSCH).

In addition, the transmitting/receiving sections 103 may transmit control information (for example, at least one of the format, the number of PUCCH units in a slot, the size of the PUCCH unit, the method of multiplexing RSs, the positions for arranging RSs, the presence/absence of RSs, the density of RSs, the presence/absence of SRSs and the UL control channel resources) related to the UL control channel (for example, a short PUCCH, a long PUCCH, etc.) via physical layer signaling (L1 signaling) and/or higher layer signaling. To be more specific, the transmitting/receiving sections 103 report, to the user terminal, information about the subcarriers where RSs are multiplexed (for example, at least one of the number of subcarriers to which RSs are allocated in one symbol and/or one PRB, the density of RSs, and the RS spacing).

Figure 20:
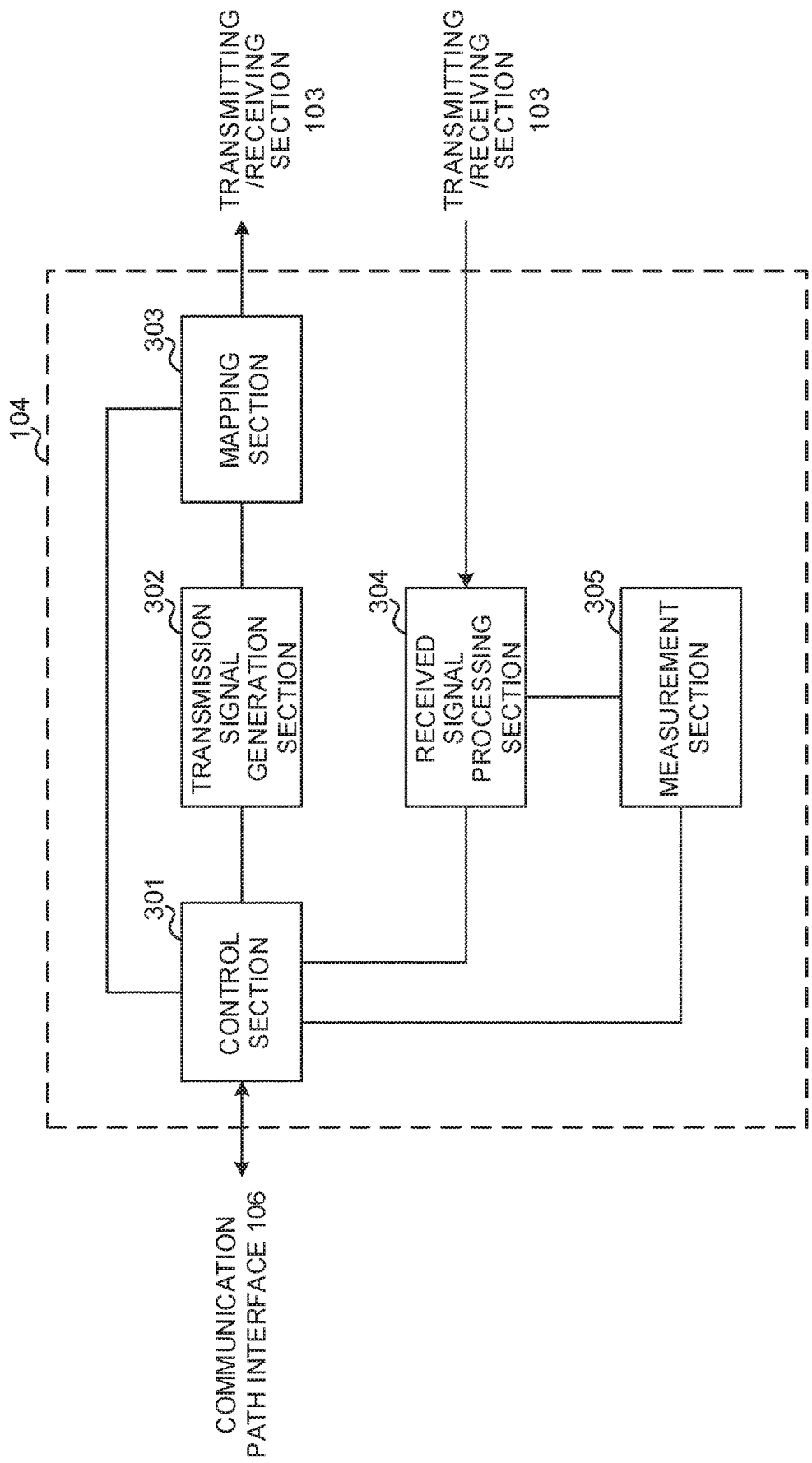
FIG. 20 is a diagram to show an example of a functional structure of a radio base station according to the present embodiment.

FIG. 20 is a diagram to show an example of a functional structure of a radio base station according to the present embodiment. Note that, although FIG. 20 primarily shows functional blocks that pertain to characteristic parts of the present embodiment, the radio base station 10 has other functional blocks that are necessary for radio communication as well. As shown in FIG. 20, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, the generation of DL signals by the transmission signal generation section 302, the mapping of DL signals by the mapping section 303, the receiving processes (for example, demodulation) for UL signals by the received signal processing section 304 and the measurements by the measurement section 305.

The control section 301 schedules user terminals 20. To be more specific, the control section 301 may perform the scheduling and/or retransmission control of DL data and/or UL data channels based on UCI from user terminals 20.

Furthermore, the control section 301 may control the format of UL control channels (for example, a long PUCCH and/or a short PUCCH) so that control information related to the UL control channels is transmitted.

In addition, the control section 301 performs channel estimation using uplink reference signals transmitted from the user terminals, and controls the demodulation of the uplink control channels (or uplink control information). Uplink control information and uplink reference signal are frequency-multiplexed, and, by making the frequency resources (for example, subcarriers) for allocating the uplink reference signals hop between different time fields (for example, symbols) and/or between different resource blocks, the uplink control information and the uplink reference signals are transmitted.

The control section 301 can be constituted by a controller, a control circuit or control apparatus that can be described based on general understanding of the technical field to which the present invention pertains.

The transmission signal generation section 302 generates DL signals (including DL data signals, DL control signals. DL reference signals and so on) based on commands from the control section 301, and outputs these signals to the mapping section 303. For the transmission signal generation section 302, a signal generator, a signal generation circuit or signal generation apparatus that can be described based on general understanding of the technical field to which the present invention pertains can be used.

The mapping section 303 maps the DL signals generated in the transmission signal generation section 302 to predetermined radio resources based on commands from the control section 301, and outputs these to the transmitting/receiving sections 103. For the mapping section 303, mapper, a mapping circuit or mapping apparatus that can be described based on general understanding of the technical field to which the present invention pertains can be used.

The received signal processing section 304 performs receiving processes (for example, demapping, demodulation, decoding, etc.) of UL signals transmitted from the user terminals 20 (including, for example, a UL data signal, a UL control signal, a UL reference signal, etc.). To be more specific, the received signal processing section 304 may outputs the received signals, the signals after the receiving processes and so on, to the measurement section 305. In addition, the received signal processing section 304 performs UCI receiving processes based on the UL control channel format commanded from the control section 301.

The measurement section 305 conducts measurements with respect to the received signals. For example, the measurement section 305 performs channel estimation using uplink reference signals, based on commands from the control section 301. The measurement section 305 can be constituted by a measurer, a measurement circuit or measurement apparatus that can be described based on general understanding of the technical field to which the present invention pertains.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement results may be output to the control section 301.

<User Terminal>

Figure 21:
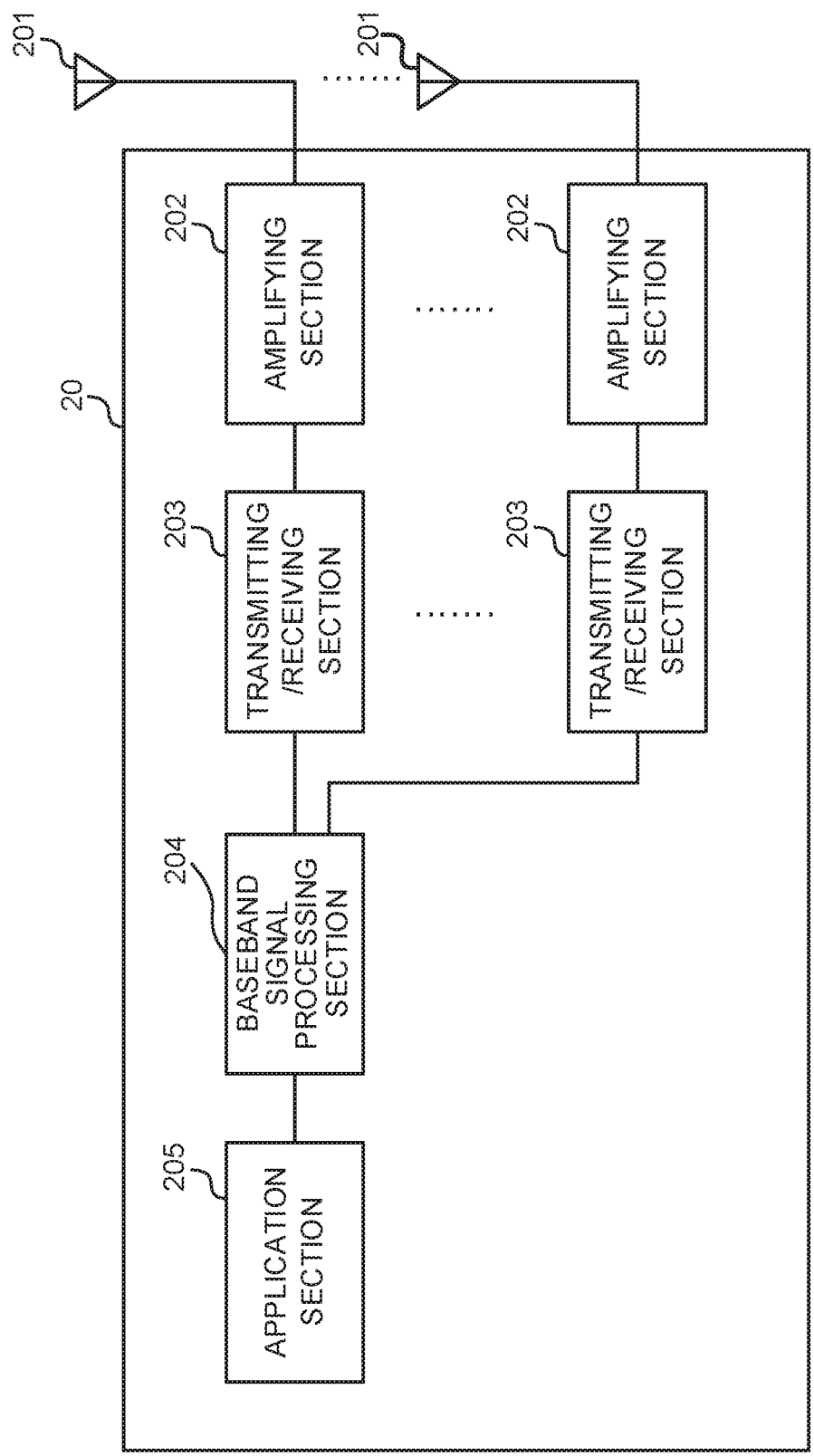
FIG. 21 is a diagram to show an example of an overall structure of a user terminal according to the present embodiment.

FIG. 21 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on. Also, the broadcast information is also forwarded to application section 205.

Meanwhile, the UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. The UCI is also subjected to at least one of channel coding, rate matching, puncturing, a DFT process and an IFFT process, and the result is forwarded to each transmitting/receiving section 203.

The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Furthermore, the transmitting/receiving sections 203 receive the DL signals (including DL data signals, DL control signals, DL reference signals, etc.) of the numerology configured in the user terminal 20, and transmits the UL signals (including UL data signals, UL control signals, UL reference signals, etc.) of the numerology.

In addition, the transmitting/receiving sections 203 transmit the UCI to the radio base station 10 using a UL data channel (for example, PUCCH) or a UL control channel (for example, a short PUCCH and/or a long PUCCH). For example, the transmitting/receiving sections 203 frequency-multiplex an RS sequence generated based on an RS base sequence with a UCI data sequence, and transmit the resulting sequence (see FIG. 17).

In addition, the transmitting/receiving sections 203 may receive control information (for example, at least one of the format, the number of PUCCH units in a slot, the size of a PUCCH unit, the method of multiplexing RSs, the positions of RSs, the presence or absence of RSs, the density of RSs, the presence or absence of SRSs and the UL control channel resources) related to a UL control channel (for example, a short PUCCH, a long PUCCH, etc.) via physical layer signaling (L1 signaling) and/or higher layer signaling. To be more specific, the transmitting/receiving sections 203 may receive information related to the subcarriers on where RSs are multiplexed (for example, at least one of the number of subcarriers in one symbol and/or one PRB where RSs are allocated, the density of RSs and the RS spacing).

For the transmitting/receiving sections 203, transmitters/receivers, transmitting/receiving circuits or transmitting/receiving apparatus that can be described based on general understanding of the technical field to which the present invention pertains can be used. Furthermore, a transmitting/receiving section 203 may be structured as one transmitting/receiving section, or may be formed with a transmitting section and a receiving section.

Figure 22:
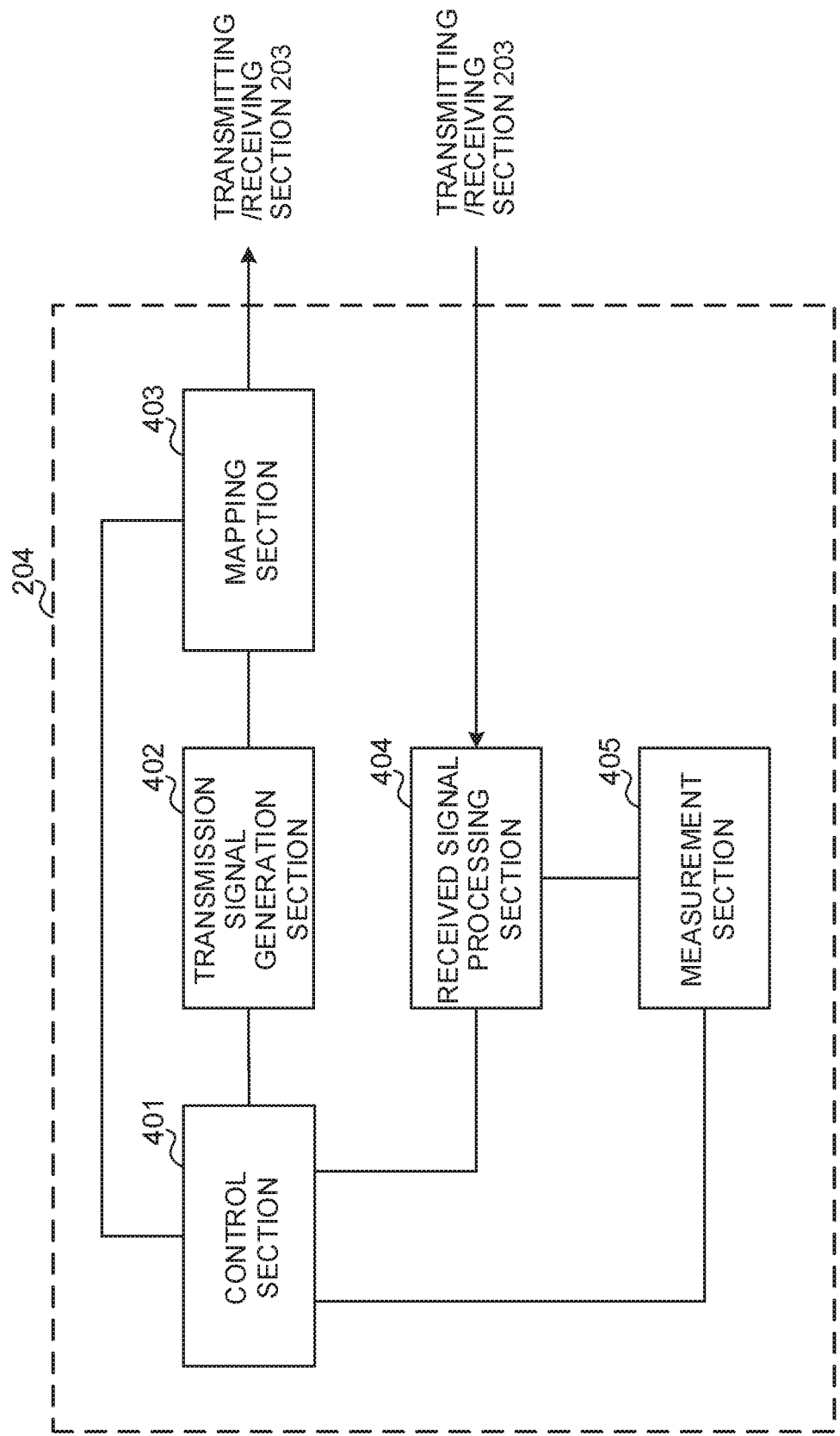
FIG. 22 is a diagram to show an example of a functional structure of a user terminal according to the present embodiment.

FIG. 22 is a diagram to show an example of a functional structure of a user terminal according to the present embodiment. Note that, although FIG. 22 primarily shows functional blocks that pertain to characteristic parts of the present embodiment, the user terminal 20 has other functional blocks that are necessary for radio communication as well. As shown in FIG. 22, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the UL signal receiving processes in the received signal processing section 404, the measurements in the measurement section 405 and so on. Furthermore, the control section 401 controls the UL control channel to be used to transmit UCI from the user terminal 20, based on explicit commands from the radio base station 10 or implicit decisions in the user terminal 20.

Furthermore, the control section 401 may control the format of a UL control channel (for example, a long PUCCH and/or a short PUCCH). The control section 401 may control the format of this UL control channel based on control information from the radio base station 10.

In addition, the control section 401 controls the allocation of uplink control information and uplink reference signals, and make the frequency resources for allocating uplink reference signal hop between different time fields (for example, symbols) and/or between different resource blocks (see FIG. 4 to FIG. 10). In this case, the control section 401 allocates uplink reference signals to part of the symbols (see FIG. 5) or all of the symbols (see FIG. 4) in the uplink control channel allocation field. Also, the control section 401 may change the number of frequency resources for allocating uplink reference signals between symbols (see FIG. 6).

Also, the control section 401 may make the uplink control channel fields in which uplink control information and uplink reference signals allocated to different frequency resources are contained, hop along the frequency direction (see FIG. 8 to FIG. 10). Furthermore, the control section 401 may exert control so that base sequences are applied to the uplink reference signals per resource block (see FIG. 12 and FIG. 13) or per multiple resource blocks (see FIG. 14 to FIG. 16).

The control section 401 may control at least one of the transmission signal generation section 402, the mapping section 403 and the transmitting/receiving sections 203 to perform UCI transmission processes based on the format of the UL control channel. For the control section 401, a controller, a control circuit or control apparatus that can be described based on general understanding of the technical field to which the present invention pertains can be used.

In the transmission signal generation section 402, UL signals (including UL data signals, UL control signals, UL reference signals, UCI, etc.) are generated (including, for example, encoding, rate matching, puncturing, modulation, etc.) based on commands from the control section 401, and output to the mapping section 403. For example, the transmission signal generation section 402 generates an RS sequence using a predetermined base sequence and the amount of phase rotation for this base sequence. When the number of base sequences is M, RS sequences may be generated by applying predetermined amounts of phase rotation ($\alpha$) to base sequences $X_0, X_1, \ldots X_{M-1}$. For the transmission signal generation section 402, a signal generator, a signal generation circuit or signal generation apparatus that can be described based on general understanding of the technical field to which the present invention pertains can be used.

The mapping section 403 maps the UL signals generated in the transmission signal generation section 402 to radio resources based on commands from the control section 401, and output the result to the transmitting/receiving sections 203. For example, the mapping section 403 performs mapping so that the RS sequences that are generated and UCI data sequences are frequency-multiplexed (FDM). For the mapping section 403, a mapper, a mapping circuit or mapping apparatus that can be described based on general understanding of the technical field to which the present invention pertains can be used.

The received signal processing section 404 performs receiving processes (for example, demapping, demodulation, decoding, etc.) of DL signals (including DL data signals, scheduling information, DL control signals, DL reference signals, etc.). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 23:
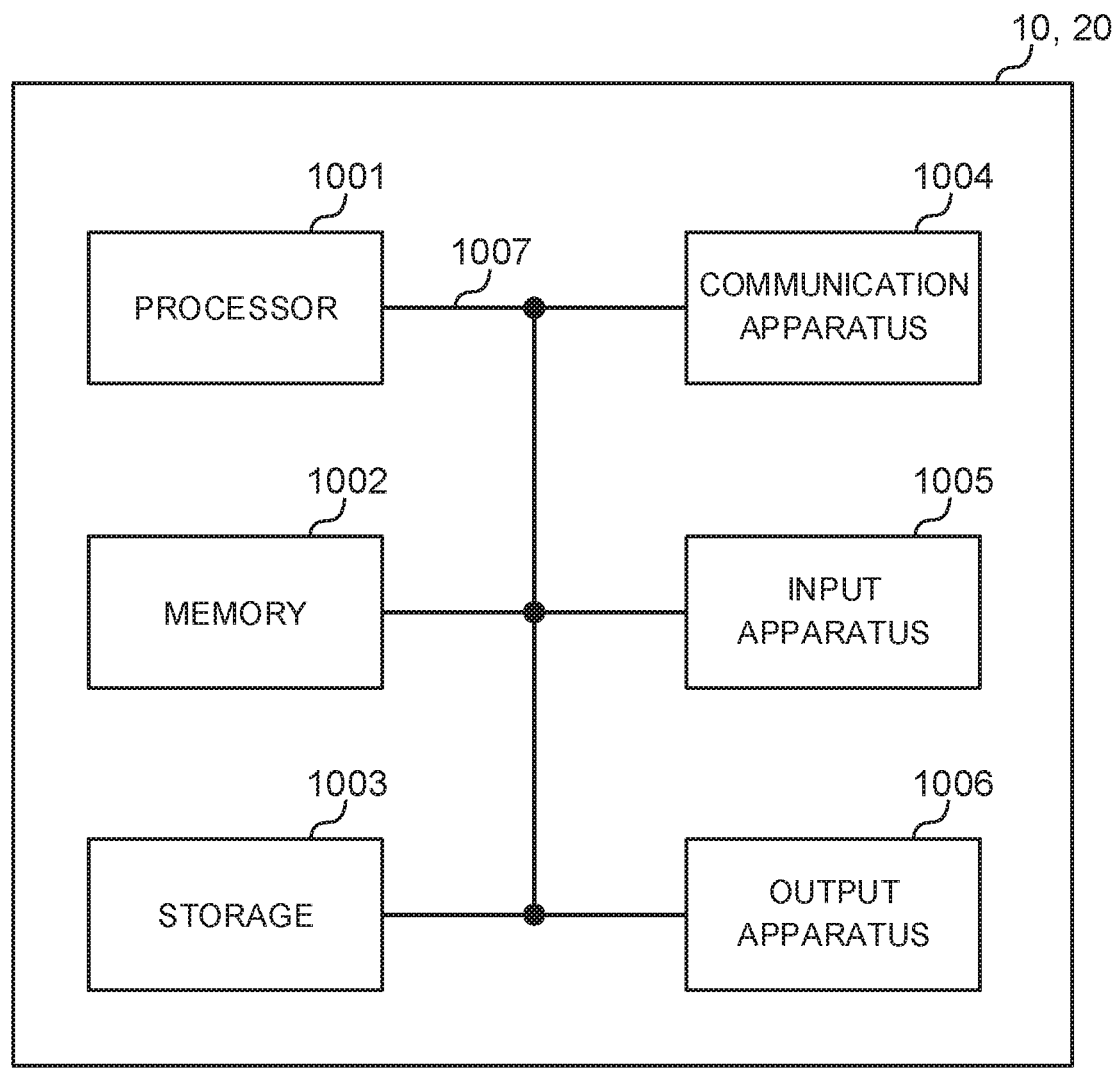
FIG. 23 is a diagram to show an example hardware structure of a radio base station and a user terminal according to the present embodiment.

For example, the radio base station, user terminals and so on according to embodiments of the present invention may function as a computer that executes the processes of the radio communication method of the present invention. FIG. 23 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-describe baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may e used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" acid so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001 the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending n which standard applies. Furthermore, a "component carrier (CC)" may be referred to as a "cell," "frequency carrier," "carrier frequency" and so on.

Further, a radio frame may be comprised of one or more periods (frames) in the time domain. Each of one or more periods (frames) constituting a radio frame may be referred to as a "subframe." Further, a subframe may be comprised of one or more slots in the time domain. A subframe may be a fixed time duration (for example, one ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini-slots. Each mini-slot may consist of one or more symbols in the time domain. Also, a mini-slot may be referred to as a "subslot."

A radio frame, subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot, slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited, to this.

The TTI may be the transmission time unit of channel-encoded data packets (transport blocks), code blocks and/or codewords, or may be the unit of processing in scheduling, link adaptation and so on. Note that when a TTI is given, the period of time (for example, the number of symbols) in which transport blocks, code blocks and/or code words are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of one ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "mini-slot," "a sub-slot" and so on.

Note that a long TTI (for example, a normal TTI, a subframe, etc.) may be replaced with a TTI having time duration exceeding one ms, and a short TTI (for example, a shortened TTI) may be replaced with a TTI having a TTI length less than the TTI length of a long TTI and not less than one ms.

A resource block (RB) is the unit of resource allocation the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "sub carrier group (SCG: Sub-Carrier Group)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PDCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so n), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors" When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Further, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In his case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-008948, filed on Jan. 20, 2017, including the specification, drawings and abstract, is incorporated herein by reference in its entirety.

The invention claimed is:
1. A terminal comprising:
a transmitter that maps an uplink control information (UCI) and a demodulation reference signal (DMRS) to different subcarriers in a physical resource block (PRB)

used to transmit a physical uplink control channel (PUCCH), and transmits the UCI and the DMRS; and a processor that performs a control to map the DMRS to different subcarriers between different symbols, and to apply a base sequence to the DMRS per one or more PRBs.

2. The terminal according to claim 1, wherein the processor performs the control to apply the base sequence to the DMRS based on an information notified by higher layer signaling.

3. The terminal according to claim 1, wherein the processor performs a control to apply a frequency hopping to the PUCCH per one symbol.

4. The terminal according to claim 2, wherein the processor performs a control to apply a frequency hopping to the PUCCH per one symbol.

5. The terminal according to claim 1, wherein the transmitter maps the DMRS to four subcarriers per one PRB, and transmits the DMRS.

6. The terminal according to claim 2, wherein the transmitter maps the DMRS to four subcarriers per one PRB, and transmits the DMRS.

7. The terminal according to claim 3, wherein the transmitter maps the DMRS to four subcarriers per one PRB, and transmits the DMRS.

8. The terminal according to claim 1, wherein the transmitter transmits the PUCCH using two symbols.

9. The terminal according to claim 2, wherein the transmitter transmits the PUCCH using two symbols.

10. The terminal according to claim 3, wherein the transmitter transmits the PUCCH using two symbols.

11. The terminal according to claim 4, wherein the transmitter transmits the PUCCH using two symbols.

12. A radio communication method for a terminal, comprising:

mapping an uplink control information (UCI) and a demodulation reference signal (DMRS) to different subcarriers in a physical resource block (PRB) used to transmit a physical uplink control channel (PUCCH);

transmitting the UCI and the DMRS; and performing a control to map the DMRS to different subcarriers between different symbols, and to apply a base sequence to the DMRS per one or more PRBs.

13. A system comprising a terminal and a base station, wherein:

the terminal comprises:
a transmitter that maps an uplink control information (UCI) and a demodulation reference signal (DMRS) to different subcarriers in a physical resource block (PRB) used to transmit a physical uplink control channel (PUCCH), and transmits the UCI and the DMRS; and
a processor that performs a control to map the DMRS to different subcarriers between different symbols, and to apply a base sequence to the DMRS per one or more PRBs; and the base station comprises:
a receiver that receives the PUCCH.

* * * * *